United States Patent
Wang

(10) Patent No.: US 11,533,249 B2
(45) Date of Patent: Dec. 20, 2022

(54) ROUTE PROCESSING METHOD AND APPARATUS, AND DATA TRANSMISSION METHOD AND APPARATUS

(71) Applicant: Huawei Technologies Co., Ltd., Shenzhen (CN)

(72) Inventor: Haibo Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 16/887,991

(22) Filed: May 29, 2020

(65) Prior Publication Data

US 2020/0296025 A1 Sep. 17, 2020

Related U.S. Application Data

(63) Continuation of application No. PCT/CN2018/100443, filed on Aug. 14, 2018.

(30) Foreign Application Priority Data

Dec. 1, 2017 (CN) .......................... 201711258440.7

(51) Int. Cl.
*H04L 45/02* (2022.01)
*H04L 12/46* (2006.01)
*H04L 9/40* (2022.01)

(52) U.S. Cl.
CPC .......... *H04L 45/02* (2013.01); *H04L 12/4675* (2013.01); *H04L 45/04* (2013.01); *H04L 63/0272* (2013.01)

(58) Field of Classification Search
CPC ..... H04L 12/4675; H04L 45/02; H04L 45/04; H04L 63/0272
See application file for complete search history.

(56) References Cited

U.S. PATENT DOCUMENTS 8,953,590 B1 * 2/2015 Aggarwal ........... H04L 12/4675
370/409
9,391,885 B1 * 7/2016 Shukla .................... H04L 45/66
(Continued)

FOREIGN PATENT DOCUMENTS

| CN | 101217457 A | 7/2008 |
| CN | 101227397 A | 7/2008 |

(Continued)

OTHER PUBLICATIONS

Dawra, G., Ed. et al, "BGP Signaling of IPv6-Segment-Routing-based VPN Networks draft-dawra-idr-srv6-vpn-02. txt", Oct. 16, 2017, 20 pages.

(Continued)

*Primary Examiner* — Melanie Jagannathan
(74) *Attorney, Agent, or Firm* — Conley Rose, P.C.

(57) ABSTRACT

A route processing method is implemented by a first PE device and includes receiving a VPN route that includes a second SRv6 VPN SID and a third SRv6 VPN SID from a second PE device; determining that the second SRv6 VPN SID is the same as a first SRv6 VPN SID; and establishing a second path based on the third SRv6 VPN SID, where when a first path directly connected to the first PE device and the second CE device is faulty, the second path is used by the first PE device to forward a packet to the second CE device.

20 Claims, 6 Drawing Sheets

(56) References Cited

U.S. PATENT DOCUMENTS

| | | | |
|---|---|---|---|
| 10,432,515 B1* | 10/2019 | Sajassi | H04L 12/4645 |
| 10,666,459 B1* | 5/2020 | Sajassi | H04L 12/4641 |
| 2011/0003263 A1 | 1/2011 | Clor | |
| 2011/0103263 A1 | 5/2011 | Unbehagen et al. | |
| 2013/0188476 A1 | 7/2013 | Nakash | |
| 2015/0109902 A1* | 4/2015 | Kumar | H04L 45/22 370/219 |
| 2015/0109904 A1* | 4/2015 | Filsfils | H04L 45/02 370/221 |
| 2016/0119229 A1 | 4/2016 | Zhou | |
| 2016/0173366 A1* | 6/2016 | Saad | H04L 45/20 370/389 |
| 2016/0191374 A1 | 6/2016 | Singh et al. | |
| 2017/0250907 A1 | 8/2017 | Pignataro et al. | |
| 2017/0288948 A1* | 10/2017 | Singh | H04L 12/4633 |
| 2018/0287946 A1* | 10/2018 | Nagarajan | H04L 12/1877 |
| 2022/0271974 A1* | 8/2022 | Wang | H04L 45/02 |

FOREIGN PATENT DOCUMENTS

| | | |
|---|---|---|
| CN | 102255759 A | 11/2011 |
| CN | 102664788 A | 9/2012 |
| CN | 104219073 A | 12/2014 |
| CN | 105071960 A | 11/2015 |
| CN | 106936714 A | 7/2017 |
| WO | 2015000173 A1 | 1/2015 |

OTHER PUBLICATIONS

Dawra, G., Ed., et al., "BGP Signaling of Ipv6-Segment-Routing-based VPN networks", draft-dawra-idr-srv6-vpn-00. txt, IETF, Mar. 12, 2017, 12 pages.

* cited by examiner

ROUTE PROCESSING METHOD AND APPARATUS, AND DATA TRANSMISSION METHOD AND APPARATUS

CROSS-REFERENCE TO RELATED APPLICATIONS

This is a continuation of Int'l Patent App. No. PCT/CN2018/100443 filed on Aug. 14, 2018, which claims priority to Chinese Patent App. No. 201711258440.7 filed on Dec. 1, 2017, which are incorporated by reference.

TECHNICAL FIELD

This disclosure relates to the field of communications technologies, and in particular, to a route processing method and an apparatus, and a data transmission method and an apparatus.

BACKGROUND

Currently, in a virtual private network (VPN), there is a common networking mode in which a customer edge (CE) device is multi-homed to a provider edge (PE) device. In this scenario, the CE device is simultaneously connected to a plurality of PEs, and there is a plurality of paths from another CE device to the CE device. In a data transmission process, when sending a packet to a destination CE device, a source CE device sends, to a PE device connected to the source CE device, the packet to be transmitted to the destination CE device. The PE device connected to the source CE device may determine, from a plurality of paths to the destination CE device, a path to transmit the packet, and transmit the packet through the path.

In the data transmission process, to avoid a case in which the packet cannot be transmitted to the destination CE device due to a fault of a PE device that is connected to the destination CE device and that is in a packet transmission path, bidirectional forwarding detection (BFD) is usually configured between the PE device connected to the source CE device and the PE device connected to the destination CE device. When determining a path to the destination CE device, the PE device connected to the source CE device may detect, based on BFD between the PE device connected to the source CE device and the PE that is connected to the destination CE and that is on the path, whether the PE device that is connected to the destination CE device and that is on the path is faulty. If it is detected that the PE device that is connected to the destination CE device and that is on the path is faulty, the PE device connected to the source CE device transmits the packet on another path to the destination CE device through switching, to ensure that the packet can be transmitted to the destination CE device.

However, in the VPN, each PE device accesses a plurality of CE devices, and each PE device establishes a path with a plurality of other PE devices in the network. To ensure that a fault on each path can be quickly detected, BFD needs to be deployed on PE devices that establish a path between the PE devices. Therefore, an amount of BFD deployed on each PE device can be equal to a quantity of paths established between the PE device and other PE devices. As a result, a relatively large amount of BFD needs to be deployed on each PE device, and excessive resources are occupied.

SUMMARY

This disclosure provides a route processing method and an apparatus, and a data transmission method and an apparatus, to effectively reduce an amount of BFD configured on each PE.

According to a first aspect, a route processing method is applied to a network that bears an Internet Protocol (IP) version 6 segment routing-based virtual private network (SRv6-based VPN) service. The network includes a first CE device, a second CE device, an ingress PE device, N egress (egress) PE devices, and at least one provider (P) device. The first CE device is connected to the ingress PE device, and the second CE device is multi-homed to the N egress PE devices. The ingress PE device is communicatively connected to the N egress PE devices by using the at least one P device, and the first CE device and the second CE device belong to a same VPN. The N egress PE devices include a first PE device and a second PE device. The first PE device is configured with a first IP version 6 segment routing (SRv6) VPN segment identifier (SID), and the first SRv6 VPN SID is used to identify the VPN to which the second CE device belongs or an outgoing interface through which the first PE is connected to the second CE device. The second PE device is configured with a second SRv6 VPN SID and a third SRv6 VPN SID, and both the second SRv6 VPN SID and the third SRv6 VPN SID are used to identify the VPN to which the second CE device belongs or an outgoing interface through which the second PE device is connected to the second CE device. N is an integer greater than or equal to 2. The method includes: receiving, by the first PE device, a first VPN route sent by the second PE device, where the first VPN route includes the second SRv6 VPN SID and the third SRv6 VPN SID; determining, by the first PE device, that the second SRv6 VPN SID is the same as the first SRv6 VPN SID; and establishing, by the first PE device, a second path from the first PE device to the second PE device based on the third SRv6 VPN SID in the first VPN route, where when a first path directly connected to the first PE device and the second CE device is faulty, the second path is used by the first PE device to forward a packet to the second CE device.

The second SRv6 VPN SID is the same as the first SRv6 VPN SID. Therefore, a path to the first SRv6 VPN SID includes a path to the first PE device and a path to the second PE device. Therefore, when a packet sent by the first CE device to the second CE device is transmitted, if a fifth path to the first PE is faulty, a sixth path to the second PE device may be determined. Further, the packet may be transmitted to the second PE device on the sixth path through switching, so that the second PE device may send the packet to the second CE device. In this way, when the first CE device sends the packet to the second CE device, in a process of determining a packet transmission path, an ingress PE device may not detect whether an egress PE device on the path is faulty. When the ingress PE device detects, in a packet transmission process, that the egress PE device is faulty, the packet is transmitted through a path that is to a PE device which has a same SRv6 VPN SID as the egress PE device, so that rapid path switching is implemented. Therefore, BFD does not need to be deployed, between PE devices that establish a path, to detect a fault. To be specific, BFD does not need to be deployed between the ingress PE device and the egress PE device to detect a fault. Therefore, an amount of BFD deployed in a PE device is reduced, resources that are of the PE device and that are occupied by the BFD is reduced, time for fault detection is reduced when the PE device determines a path, and a path switching speed is increased. In addition, the second PE device is configured with the third SRv6 VPN SID that is different from the first SRv6 VPN SID, so that the first PE device may establish the second path based on the third SRv6 VPN SID in the first VPN route. In this way, when a path directly connected to the first PE device and the second CE device is faulty, a packet transmitted by the first PE device to the second CE device may be transmitted on the second path through switching. Therefore, rapid path switching is implemented, the packet can be transmitted to the second CE device, and multi-homing protection is implemented.

With reference to the first aspect, in a first implementation of the first aspect, the method further includes: sending, by the first PE device, a second VPN route to the second PE device, where the second VPN route carries the first SRv6 VPN SID and a fourth SRv6 VPN SID, the fourth SRv6 VPN SID is used to identify the VPN to which the second CE device belongs or the outgoing interface through which the first PE device is connected to the second CE device, the fourth SRv6 VPN SID is used by the second PE device to establish a third path from the second PE device to the first PE device, when a fourth path directly connected to the second PE device and the second CE device is faulty, the third path is used by the second PE device to transmit a packet to the second CE device, the fourth SRv6 VPN SID is different from the first SRv6 VPN SID, and the first SRv6 VPN SID is the same as the second SRv6 VPN SID stored in the second PE device.

In this implementation, the first PE device is configured with the fourth SRv6 VPN SID, so that the second PE device may establish the second path based on the fourth SRv6 VPN SID. In this way, when a path directly connected to the second PE device and the second CE device is faulty, a packet transmitted by the second PE device to the second CE device may be transmitted on the third path through switching. Therefore, rapid path switching is implemented, the packet can be transmitted to the second CE device, and multi-homing protection is implemented.

With reference to the first aspect or any one of the implementations of the first aspect, in a second implementation of the first aspect, the first VPN route is carried in a border gateway protocol-prefix-segment identifier (BGP-Prefix-SID) attribute field of a multiprotocol extension for border gateway protocol (MP-BGP) message. The BGP-Prefix-SID attribute field includes an SRv6-VPN SID type-length-value (TLV) field, and the SRv6-VPN SID TLV field includes a type (T) field, a length (L) field, and a value (value, V) field. The V field is used to carry the third SRv6 VPN SID.

With reference to the first aspect or any one of the implementations of the first aspect, in a third implementation of the first aspect, the method further includes: receiving, by the first PE device, a first packet, where the first packet is sent by the first CE device to the second CE device, and an outer destination address encapsulated in the first packet is the first SRv6 VPN SID; determining, by the first PE device, that the first path is faulty; and determining, by the first PE device based on the first SRv6 VPN SID and the third SRv6 VPN SID, to forward the first packet through the second path.

In this implementation, when the first PE device transmits a packet to the second CE device, and a path directly connected to the first PE device and the second CE device is faulty, the packet may be transmitted on the second path through switching. Therefore, rapid path switching is implemented, the packet can be transmitted to the second CE device, and multi-homing protection is implemented.

According to a second aspect, a data transmission method is applied in a network that bears an SRv6-based VPN service. The network includes a first CE device, a second CE device, an ingress PE device, N egress PE devices, and at least one P device. The first CE device is connected to the ingress PE device, and the second CE device is multi-homed to the N egress PE devices. The ingress PE device is communicatively connected to the N egress PE devices by using the at least one P device, and the first CE device and the second CE device belong to a same VPN. The N egress PE devices include a first PE device and a second PE device. The first PE device is configured with a first SRv6 VPN SID, and the first SRv6 VPN SID is used to identify the VPN to which the second CE device belongs or an outgoing interface through which the first PE device is connected to the second CE device. The second PE device is configured with a second SRv6 VPN SID and a third SRv6 VPN SID, and both the second SRv6 VPN SID and the third SRv6 VPN SID are used to identify the VPN to which the second CE device belongs or an outgoing interface through which the second PE device is connected to the second CE device. The first SRv6 VPN SID is the same as the second SRv6 VPN SID, and N is an integer greater than or equal to 2. The method includes: receiving, by the first PE device, a first packet, where the first packet is sent by the first CE device to the second CE device, and an outer destination address encapsulated in the first packet is the first SRv6 VPN SID; determining, by the first PE device based on the first SRv6 VPN SID, a first path for forwarding the first packet, where the first path is directly connected to the first PE device and the second CE device; determining, by the first PE device, that the first path is faulty, and determining, by the first PE device based on the first SRv6 VPN SID and the stored third SRv6 VPN SID sent by the second PE device, to forward the first packet through a second path, where the first PE device is connected to the second PE device by using the second path; and forwarding, by the first PE device, the first packet to the second CE through the second path.

The second SRv6 VPN SID is the same as the first SRv6 VPN SID. Therefore, a path to the first SRv6 VPN SID includes a path to the first PE device and a path to the second PE device. Therefore, when a packet sent by the first CE device to the second CE device is transmitted, if a fifth path to the first PE is faulty, a sixth path to the second PE device may be determined. Further, the packet may be transmitted to the second PE device on the sixth path through switching, so that the second PE device may send the packet to the second CE device. In this way, when the first CE device sends the packet to the second CE device, in a process of determining a packet transmission path, an ingress PE device may not detect whether an egress PE device on the path is faulty. When the ingress PE device detects, in a packet transmission process, that the egress PE device is faulty, the packet is transmitted through a path that is to a PE device which has a same SRv6 VPN SID as the egress PE device, so that rapid path switching is implemented. Therefore, BFD does not need to be deployed, between PE devices that establish a path, to detect a fault. To be specific, BFD does not need to be deployed between the ingress PE device and the egress PE device to detect a fault. Therefore, an amount of BFD deployed in a PE device is reduced, resources that are of the PE device and that are occupied by the BFD is reduced, time for fault detection is reduced when the PE device determines a path, and a path switching speed is increased. In addition, the first PE device transmits the first packet to the second CE device. When a path directly connected to the first PE device and the second CE device is faulty, the first PE device determines the second path based on the first SRv6 VPN SID and the stored third SRv6 VPN SID sent by the second PE device, and transmits the first packet on the second path through switching. Therefore, rapid path switching is implemented, the packet can be transmitted to the second CE device, and multi-homing protection is implemented.

With reference to the second aspect, in a first implementation of the second aspect, before the receiving, by the first PE device, a first packet, the method further includes: receiving, by the first PE device, a first VPN route sent by the second PE device, where the first VPN route includes the second SRv6 VPN SID and the third SRv6 VPN SID; determining, by the first PE device, that the second SRv6 VPN SID is the same as the first SRv6 VPN SID; and establishing, by the first PE device, the second path based on the third SRv6 VPN SID.

According to a third aspect, a route processing method is applied in a network that bears an SRv6-based VPN service. The network includes a first CE device, a second CE device, an ingress PE device, N egress PE devices, and at least one P device. The first CE device is connected to the ingress PE device, and the second CE device is multi-homed to the N egress PE devices. The ingress PE device is communicatively connected to the N egress PE devices by using the at least one P device, and the first CE device and the second CE device belong to a same VPN. The N egress PE devices include a first PE device and a second PE device. The first PE device is configured with a first SRv6 VPN SID, and the first SRv6 VPN SID is used to identify the VPN to which the second CE device belongs or an outgoing interface through which the first PE is connected to the second CE device. The second PE device is configured with a second SRv6 VPN SID, and the second SRv6 VPN SID is used to identify the VPN to which the second CE device belongs or an outgoing interface through which the second PE device is connected to the second CE device. The first SRv6 VPN SID is the same as the second SRv6 VPN SID. The at least one P device includes a first P device, the first P device is a neighboring node of the first PE device, and the first PE device is a next hop of the first P device. N is an integer greater than or equal to 2. The method includes: receiving, by the first P device, a first route sent by the first PE device, where the first route includes a network segment to which the first SRv6 VPN SID belongs; receiving, by the first P device, a second route sent by the second PE device, where the second route includes a network segment to which the second SRv6 VPN SID belongs; establishing, by the first P device, a fifth path from the first P device to the first PE device based on the network segment to which the first SRv6 VPN SID belongs, where the fifth path is used by the first P device to forward a packet to the second CE device; and establishing, by the first P device, a sixth path from the first P device to the second PE device based on the network segment to which the second SRv6 VPN SID belongs, where when the fifth path is faulty, the sixth path is used by the first P device to forward the packet to the second CE device.

The second SRv6 VPN SID is the same as the first SRv6 VPN SID. Therefore, a path from the first P device to the first SRv6 VPN SID includes a path to the first PE device and a path to the second PE device. Therefore, when a packet sent by the first CE device to the second CE device is transmitted by the first P device, if the fifth path to the first PE is faulty, the first P device may determine the sixth path to the second PE device, and further transmit the packet to the second PE device on the sixth path through switching, so that the second PE device may send the packet to the second CE device. In this way, when the first CE device sends the packet to the second CE device, in a process of determining a packet transmission path, an ingress PE device may not detect whether an egress PE device on the path is faulty.

When the ingress PE device detects, in a packet transmission process, that the egress PE device is faulty, the packet is transmitted through a path that is to a PE device which has a same SRv6 VPN SID as the egress PE device, so that rapid path switching is implemented. Therefore, BFD does not need to be deployed, between PE devices that establish a path, to detect a fault. To be specific, BFD does not need to be deployed between the ingress PE device and the egress PE device to detect a fault. Therefore, an amount of BFD deployed in a PE device is reduced, resources that are of the PE device and that are occupied by the BFD is reduced, time for fault detection is reduced when the PE device determines a path, and a path switching speed is increased.

With reference to the third aspect, in a first implementation of the third aspect, the method further includes: receiving, by the first P device, a first packet, where the first packet is sent by the first CE device to the second CE device, and an outer destination address encapsulated in the first packet is the first SRv6 VPN SID; determining, by the first P device, that the first path is faulty; and determining, by the first P device based on the first SRv6 VPN SID, to forward the first packet through the sixth path.

According to a fourth aspect, a data transmission method is applied in a network that bears an SRv6-based VPN service. The network includes a first CE device, a second CE device, an ingress PE device, N egress PE devices, and at least one P device. The first CE device is connected to the ingress PE device, and the second CE device is multi-homed to the N egress PE devices. The ingress PE device is communicatively connected to the N egress PE devices by using the at least one P device, and the first CE device and the second CE device belong to a same VPN. The N egress PE devices include a first PE device and a second PE device. The first PE device is configured with a first SRv6 VPN SID, and the first SRv6 VPN SID is used to identify the VPN to which the second CE device belongs or an outgoing interface through which the first PE is connected to the second CE device. The second PE device is configured with a second SRv6 VPN SID, and the second SRv6 VPN SID is used to identify the VPN to which the second CE device belongs or an outgoing interface through which the second PE device is connected to the second CE device. The first SRv6 VPN SID is the same as the second SRv6 VPN SID. The at least one P device includes a first P device, the first P device is a neighboring node of the first PE device, and the first PE device is a next hop of the first P device. N is an integer greater than or equal to 2. The method includes: receiving, by the first P device, a first packet, where the first packet is sent by the first CE device to the second CE device, and an outer destination address encapsulated in the first packet is the first SRv6 VPN SID; determining, by the first P device based on the first SRv6 VPN SID, a fifth path for forwarding the first packet, where the first P device is connected to the first PE device by using the fifth path; determining, by the first P device, that the fifth path is faulty, and determining, by the first P device based on the first SRv6 VPN SID, to forward the first packet through a sixth path, where the first P device is connected to the second PE by using the sixth path; and forwarding, by the first P device, the first packet to the second CE device through the sixth path.

The second SRv6 VPN SID is the same as the first SRv6 VPN SID. Therefore, a path from the first P device to the first SRv6 VPN SID includes a path to the first PE device and a path to the second PE device. Therefore, when a packet sent by the first CE device to the second CE device is transmitted by the first P device, if the fifth path to the first PE is faulty, the first P device may determine the sixth path to the second PE device, and further transmit the packet to the second PE device on the sixth path through switching, so that the second PE device may send the packet to the second CE device. In this way, when the first CE device sends the packet to the second CE device, in a process of determining a packet transmission path, an ingress PE device may not detect whether an egress PE device on the path is faulty. When the ingress PE device detects, in a packet transmission process, that the egress PE device is faulty, the packet is transmitted through a path that is to a PE device which has a same SRv6 VPN SID as the egress PE device, so that rapid path switching is implemented. Therefore, BFD does not need to be deployed, between PE devices that establish a path, to detect a fault. To be specific, BFD does not need to be deployed between the ingress PE device and the egress PE device to detect a fault. Therefore, an amount of BFD deployed in a PE device is reduced, resources that are of the PE device and that are occupied by the BFD is reduced, time for fault detection is reduced when the PE device determines a path, and a path switching speed is increased.

With reference to the fourth aspect, in a first implementation of the fourth aspect, before the receiving, by the first P device, a first packet, the method further includes: receiving, by the first P device, a first route sent by the first PE device, where the first route includes a network segment to which the first SRv6 VPN SID belongs; receiving, by the first P device, a second route sent by the second PE device, where the second route includes a network segment to which the second SRv6 VPN SID belongs; establishing, by the first P device, the fifth path based on the network segment to which the first SRv6 VPN SID belongs; and establishing, by the first P device, the sixth path based on the network segment to which the second SRv6 VPN SID belongs, where when the fifth path is faulty, the sixth path is used by the first P device to forward the packet to the second CE device.

According to a fifth aspect, a PE device is used as a first PE device, and is used in a network that bears an SRv6-based VPN service. The network includes a first CE device, a second CE device, an ingress PE device, N egress PE devices, and at least one P device. The first CE device is connected to the ingress PE device, and the second CE device is multi-homed to the N egress PE devices. The ingress PE device is communicatively connected to the N egress PE devices by using the at least one P device, and the first CE device and the second CE device belong to a same VPN. The N egress PE devices include a first PE device and a second PE device. The first PE device is configured with a first SRv6 VPN SID, and the first SRv6 VPN SID is used to identify the VPN to which the second CE device belongs or an outgoing interface through which the first PE is connected to the second CE device. The second PE device is configured with a second SRv6 VPN SID and a third SRv6 VPN SID, and both the second SRv6 VPN SID and the third SRv6 VPN SID are used to identify the VPN to which the second CE device belongs or an outgoing interface through which the second PE device is connected to the second CE device. N is an integer greater than or equal to 2. The first PE device includes: a receiving unit configured to receive a first VPN route sent by the second PE device, where the first VPN route includes the second SRv6 VPN SID and the third SRv6 VPN SID; and a processing unit configured to determine that the second SRv6 VPN SID is the same as the first SRv6 VPN SID, where the processing unit is further configured to establish a second path from the first PE device to the second PE device based on the third SRv6 VPN SID in the first VPN route, where when a first path directly connected to the first PE device and the second CE device is faulty, the second path is used by the first PE device to forward a packet to the second CE device.

With reference to the fifth aspect, in a first implementation of the fifth aspect, the first PE device further includes: a sending unit configured to send a second VPN route to the second PE device, where the second VPN route carries the first SRv6 VPN SID and a fourth SRv6 VPN SID, the fourth SRv6 VPN SID is used to identify the VPN to which the second CE device belongs or the outgoing interface through which the first PE device is connected to the second CE device, the fourth SRv6 VPN SID is used by the second PE device to establish a third path from the second PE device to the first PE device, when a fourth path directly connected to the second PE device and the second CE device is faulty, the third path is used by the second PE device to transmit a packet to the second CE device, the fourth SRv6 VPN SID is different from the first SRv6 VPN SID, and the first SRv6 VPN SID is the same as the second SRv6 VPN SID stored in the second PE device.

With reference to the fifth aspect or any one of the implementations of the fifth aspect, in a second implementation of the fifth aspect, the first VPN route is carried in a BGP-Prefix-SID attribute field of an MP-BGP message, and the BGP-Prefix-SID attribute field includes an SRv6-VPN SID TLV field. The SRv6-VPN SID TLV field includes a T field, an L field, and a V field, and the V field is used to carry the third SRv6 VPN SID.

With reference to the fifth aspect or any one of the implementations of the fifth aspect, in a third implementation of the fifth aspect, the receiving unit is further configured to receive a first packet. The first packet is sent by the first CE device to the second CE device, and an outer destination address encapsulated in the first packet is the first SRv6 VPN SID.

The processing unit is further configured to determine that the first path is faulty.

The processing unit is further configured to determine, based on the first SRv6 VPN SID and the third SRv6 VPN SID, to forward the first packet through the second path.

According to a sixth aspect, a PE device is used as a first PE device, and is used in a network that bears an SRv6-based VPN service. The network includes a first CE device, a second CE device, an ingress PE device, N egress PE devices, and at least one P device. The first CE device is connected to the ingress PE device, and the second CE device is multi-homed to the N egress PE devices. The ingress PE device is communicatively connected to the N egress PE devices by using the at least one P device, and the first CE device and the second CE device belong to a same VPN. The N egress PE devices include a first PE device and a second PE device. The first PE device is configured with a first SRv6 VPN SID, and the first SRv6 VPN SID is used to identify the VPN to which the second CE device belongs or an outgoing interface through which the first PE device is connected to the second CE device. The second PE device is configured with a second SRv6 VPN SID and a third SRv6 VPN SID, and both the second SRv6 VPN SID and the third SRv6 VPN SID are used to identify the VPN to which the second CE device belongs or an outgoing interface through which the second PE device is connected to the second CE device. The first SRv6 VPN SID is the same as the second SRv6 VPN SID, and N is an integer greater than or equal to 2. The first PE device includes: a receiving unit configured to receive a first packet, where the first packet is sent by the first CE device to the second CE device, and an outer destination address encapsulated in the first packet is the first SRv6 VPN SID; a processing unit configured to determine, based on the first SRv6 VPN SID, a first path for forwarding the first packet, where the first path is directly connected to the first PE device and the second CE device, where the processing unit is further configured to determine that the first path is faulty, where the first PE device determines, based on the first SRv6 VPN SID and the stored third SRv6 VPN SID sent by the second PE device, to forward the first packet through a second path, and the first PE device is connected to the second PE device by using the second path; and a sending unit configured to forward the first packet to the second CE through the second path.

With reference to the sixth aspect, in a first implementation of the first aspect, the receiving unit is further configured to receive a first VPN route sent by the second PE device, and the first VPN route includes the second SRv6 VPN SID and the third SRv6 VPN SID.

The processing unit is further configured to establish the second path based on the third SRv6 VPN SID when determining that the second SRv6 VPN SID is the same as the first SRv6 VPN SID.

According to a seventh aspect, a P device is used as a first P device, and is used in a network that bears an SRv6-based VPN service. The network includes a first CE device, a second CE device, an ingress PE device, N egress PE devices, and at least one P device. The first CE device is connected to the ingress PE device, and the second CE device is multi-homed to the N egress PE devices. The ingress PE device is communicatively connected to the N egress PE devices by using the at least one P device, and the first CE device and the second CE device belong to a same VPN. The N egress PE devices include a first PE device and a second PE device. The first PE device is configured with a first SRv6 VPN SID, and the first SRv6 VPN SID is used to identify the VPN to which the second CE device belongs or an outgoing interface through which the first PE is connected to the second CE device. The second PE device is configured with a second SRv6 VPN SID, and the second SRv6 VPN SID is used to identify the VPN to which the second CE device belongs or an outgoing interface through which the second PE device is connected to the second CE device. The first SRv6 VPN SID is the same as the second SRv6 VPN SID. The at least one P device includes the first P device, the first P device is a neighboring node of the first PE device, and the first PE device is a next hop of the first P device. N is an integer greater than or equal to 2. The first P device includes: a receiving unit configured to receive a first route sent by the first PE device, where the first route includes a network segment to which the first SRv6 VPN SID belongs, where the receiving unit is further configured to receive a second route sent by the second PE device, where the second route includes a network segment to which the second SRv6 VPN SID belongs; and a processing unit configured to establish a fifth path from the first P device to the first PE device based on the network segment to which the first SRv6 VPN SID belongs, where the fifth path is used by the first P device to forward a packet to the second CE device, where the processing unit is further configured to establish a sixth path from the first P device to the second PE device based on the network segment to which the second SRv6 VPN SID belongs, where when the fifth path is faulty, the sixth path is used by the first P device to forward the packet to the second CE device.

With reference to the seventh aspect, in a first implementation of the seventh aspect, the receiving unit is further configured to receive a first packet. The first packet is sent by the first CE device to the second CE device, and an outer destination address encapsulated in the first packet is the first SRv6 VPN SID.

The processing unit is further configured to determine, based on the first SRv6 VPN SID when the fifth path is faulty, to forward the first packet through the sixth path.

According to an eighth aspect, a P device is used as a first P device, and is used in a network that bears an SRv6-based VPN service. The network includes a first CE device, a second CE device, an ingress PE device, N egress PE devices, and at least one P device. The first CE device is connected to the ingress PE device, and the second CE device is multi-homed to the N egress PE devices. The ingress PE device is communicatively connected to the N egress PE devices by using the at least one P device, and the first CE device and the second CE device belong to a same VPN. The N egress PE devices include a first PE device and a second PE device. The first PE device is conigured with a first SRv6 VPN SID, and the first SRv6 VPN SID is used to identify the VPN to which the second CE device belongs or an outgoing interface through which the first PE is connected to the second CE device. The second PE device is conigured with a second SRv6 VPN SID, and the second SRv6 VPN SID is used to identify the VPN to which the second CE device belongs or an outgoing interface through which the second PE device is connected to the second CE device. The first SRv6 VPN SID is the same as the second SRv6 VPN SID. The at least one P device includes the first P device, the first P device is a neighboring node of the first PE device, and the first PE device is a next hop of the first P device. N is an integer greater than or equal to 2. The first P device includes: a receiving unit configured to receive a first packet, where the first packet is sent by the first CE device to the second CE device, and an outer destination address encapsulated in the first packet is the first SRv6 VPN SID; a processing unit configured to determine, based on the first SRv6 VPN SID, a fifth path for transmitting the first packet, where the first P device is connected to the first PE device by using the fifth path, where the processing unit is further configured to determine that the fifth path is faulty, where the first P device determines, based on the first SRv6 VPN SID, to forward the first packet through a sixth path, and the first P device is connected to the second PE by using the sixth path; and a sending unit configured to forward the first packet to the second CE device through the sixth path.

With reference to the eighth aspect, in a first implementation of the eighth aspect, the receiving unit is further configured to receive a first route sent by the first PE device, and the first route includes a network segment to which the first SRv6 VPN SID belongs.

The receiving unit is further configured to receive a second route sent by the second PE device, and the second route includes a network segment to which the second SRv6 VPN SID belongs.

The processing unit is further configured to: establish the fifth path based on the network segment to which the first SRv6 VPN SID belongs, and establish the sixth path based on the network segment to which the second SRv6 VPN SID belongs. When the fifth path is faulty, the sixth path is used by the first P device to forward the packet to the second CE device.

According to a ninth aspect, a communications system includes the PE device according to the fifth aspect or any one of the implementations of the fifth aspect and the P device according to the seventh aspect or any one of the implementations of the seventh aspect.

According to a tenth aspect, a communications system includes the PE device according to the fifth aspect or any one of the implementations of the fifth aspect and the P device according to the eighth aspect or any one of the implementations of the eighth aspect.

According to an eleventh aspect, a communications system includes the PE device according to the sixth aspect or any one of the implementations of the sixth aspect and the P device according to the seventh aspect or any one of the implementations of the seventh aspect.

According to a twelfth aspect, a communications system includes the PE device according to the sixth aspect or any one of the implementations of the sixth aspect and the P device according to the eighth aspect or any one of the implementations of the eighth aspect.

According to a thirteenth aspect, a PE device includes a processor, a memory, and a communications interface.

The memory and the communications interface are coupled to the processor.

The memory is configured to store computer program code, and the computer program code includes an instruction. When the processor executes the instruction, the PE device is configured to perform the route processing method according to the first aspect or any one of the implementations of the first aspect.

According to a fourteenth aspect, a PE device includes a processor, a memory, and a communications interface.

The memory and the communications interface are coupled to the processor.

The memory is configured to store computer program code, and the computer program code includes an instruction. When the processor executes the instruction, the PE device is configured to perform the data transmission method according to the second aspect or any one of the implementations of the second aspect.

According to a fifteenth aspect, a P device includes a processor, a memory, and a communications interface.

The memory and the communications interface are coupled to the processor.

The memory is configured to store computer program code, and the computer program code includes an instruction. When the processor executes the instruction, the P device is configured to perform the route processing method according to the third aspect or any one of the implementations of the third aspect.

According to a sixteenth aspect, a P device includes a processor, a memory, and a communications interface.

The memory and the communications interface are coupled to the processor.

The memory is configured to store computer program code, and the computer program code includes an instruction. When the processor executes the instruction, the P device is configured to perform the data transmission method according to the fourth aspect or any one of the implementations of the fourth aspect.

According to a seventeenth aspect, a computer readable storage medium stores an instruction, and when the instruction is run on a computer, the computer is enabled to perform the route processing method according to the first aspect or any one of the implementations of the first aspect.

According to an eighteenth aspect, a computer readable storage medium stores an instruction, and when the instruction is run on a computer, the computer is enabled to perform the data transmission method according to the second aspect or any one of the implementations of the second aspect.

According to a nineteenth aspect, a computer readable storage medium stores an instruction, and when the instruction is run on a computer, the computer is enabled to perform the route processing method according to the third aspect or any one of the implementations of the third aspect.

According to a twentieth aspect, a computer readable storage medium stores an instruction, and when the instruction is run on a computer, the computer is enabled to perform the data transmission method according to the fourth aspect or any one of the implementations of the fourth aspect.

DESCRIPTION OF EMBODIMENTS

To make the purpose, technical solutions, and advantages of the embodiments clearer, the following clearly describes the technical solutions of the embodiments with reference to the accompanying drawings.

For the SRv6-based VPN technology, refer to the description in the draft "BGP Signaling of IPv6-Segment-Routing-based VPN networks draft-dawra-idr-srv6-vpn-02.txt" of the Internet Engineering Task Force (IETF). Content in the draft is incorporated and applied in its entirety.

Unless otherwise stated, ordinal numbers such as "first", "second", "third", "fourth", "fifth", and "sixth" mentioned in the embodiments are used to distinguish between a plurality of objects, and are not intended to limit a sequence of the plurality of objects.

Figure 1:
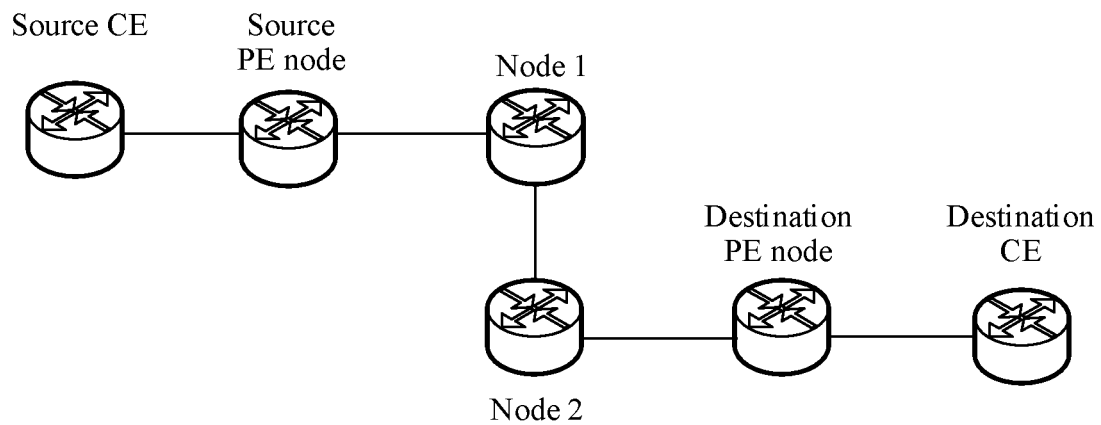
FIG. 1 is a schematic architectural diagram of an SRv6 network according to an embodiment.

The following describes, by using an example with reference to a network scenario shown in FIG. 1, the IP version 6 segment routing (SRv6) technology in the embodiments. It should be understood that the scenario shown in FIG. 1 does not need to be understood as a limitation. As shown in FIG. 1, a source host is connected to a source PE, the source PE is connected to a destination PE by using a node 1 and a node 2, and the destination PE is connected to a destination host.

An SRv6 network is a network architecture formed by using a segment routing (SR) tunnel encapsulation technology based on an IP version 6 (IPv6) network. In the SRv6 network, an SR tunneling technology is a tunnel encapsulation technology implemented based on extension of an interior gateway protocol (IGP). "Segment" is essentially a segment identifier used to identify a corresponding route, for example, may be an IPv6 address used to identify a link or a next hop. "Routing" represents a route. Therefore, segment routing may be defined as a Segment of Routing that may be briefly referred to as Segment Routing (SR). An implementation mode of SR includes but is not limited to a segment routing-traffic engineering (SR-TE) mode, a segment routing-best effort (SR-BE) mode, and the like. In a network constructed by using an SR-BE tunneling technology, an outer tunnel address and an inner tunnel address are set to identify a service forwarding path. The outer tunnel address may be, for example, an IPv6 address of a destination node device in a tunnel, and the inner tunnel address may be an IPv6 address of a source node device in the tunnel. A packet forwarding path that is to the destination node device may be controlled by encapsulating, at the source node device based on an SR-BE tunnel, an outer tunnel address for a packet. In view of this, when multi-homing protection is configured by using the SR-BE tunneling technology, configuration related to an intermediate path and path switching may be simplified, and only the outer tunnel address indicating an outer tunnel from the source node device to the destination node device needs to be configured. Therefore, multi-homing protection configured by using the SR-BE technology is widely applied. FIG. 1 is used as an example. The source PE is a source node device in an SR tunnel, and the destination PE is a destination node device in the SR tunnel. The source PE, the node 1, the node 2, and the destination PE form the SR tunnel for data transmission. The source PE is connected to the source host through an interface 1, and the destination PE is connected to the destination host. If an IPv6 address of the source PE is A, and an IPv6 address of the destination PE is B, when the source PE receives, from the interface 1, a packet sent by the source host to the destination host, the source PE searches a VPN routing and forwarding (VRF) table associated with the interface 1, and determines route-associated tunnel information, to encapsulate the packet. A source host address and a destination host address are encapsulated in an inner layer of the packet, and an IPv6 packet header is encapsulated in an outer layer of the packet. An outer destination address encapsulated in the IPv6 packet header is the IPv6 address B of the destination PE in the tunnel, and an inner source address in the IPv6 packet header is the IPv6 address A of the source PE in the tunnel. Based on the outer destination address in the IPv6 packet header, the packet is instructed to be forwarded to a last hop in the SR tunnel, namely, the destination PE. After removing the IPv6 packet header from the packet, the destination PE sends the packet to the destination host.

A network based on an SR-TE tunnel is an SR tunnel encapsulation technology, and according to the technology, a forwarding path is strictly restricted. To be specific, between the source PE and the destination PE, each node on the forwarding path is strictly restricted. FIG. 1 is used as an example. The source PE is the source node device in the SR tunnel, and the destination PE is the destination node device in the SR tunnel. The source PE, the node 1, the node 2, and the destination PE form the SR tunnel for data transmission. The source PE is connected to the source host through the interface 1, and the destination PE is connected to the destination host. If the IPv6 address of the source PE is A, and the IPv6 address of the destination PE is B, when the source PE receives, from the interface 1, a packet sent by the source host to the destination host, the source PE searches the VRF routing table associated with the interface 1, and determines route-associated tunnel information, to encapsulate the packet based on the tunnel information. The source host address and the destination host address are encapsulated in an inner layer of the packet, and an address of a node that is designated by the SR tunnel to be passed through is encapsulated in an outer layer of the packet. To be specific, the tunnel information indicates a path that is to the destination PE and that passes through the node 1 and the node 2. Therefore, an address of the node 1, an address of the node 2, and an address the destination PE are encapsulated in the packet from inside to outside sequentially, to determine a packet transmission path. Then, the IPv6 packet header is encapsulated on an outermost side of the packet. The outer destination address encapsulated in the IPv6 packet header is an address of a next hop node (the address of the node 1) in the SR tunnel through which the source PE transmits the packet, and the inner source address in the IPv6 packet header is the IPv6 address A of the source PE on the tunnel. The node 1 receives a packet sent by the source PE, determines an address of a next hop based on an address that is encapsulated in the packet and that is of a node that is designated by the SR tunnel to be passed through, determines a next hop node (the node 2) according to a longest matching principle, changes the outer destination address in the IPv6 packet header on the outermost side of the packet into an address of a next hop node of the node 1 (the address of the node 2), and sends the packet to the node 2. After receiving the packet, the node 2 determines an address of a next hop based on the address that is encapsulated in the packet and that is of a node that is designated by the SR tunnel to be passed through, and determines a next hop node (the destination PE) according to the longest matching principle. In this case, the node 2 may further determine that the next hop node is a penultimate hop node in the SR tunnel based on the address that is of the node that is designated by the SR tunnel to be passed through, remove the address that is encapsulated in the packet and that is of the node that is designated by the SR tunnel to be passed through, change the outer destination address in the IPv6 packet header on the outermost side of the packet into the address of the destination PE, and send the packet to the destination PE. Therefore, a process of forwarding the packet through the SR tunnel is completed. After removing the IPv6 packet header in the packet, the destination PE sends the packet to the destination host.

Figure 2:
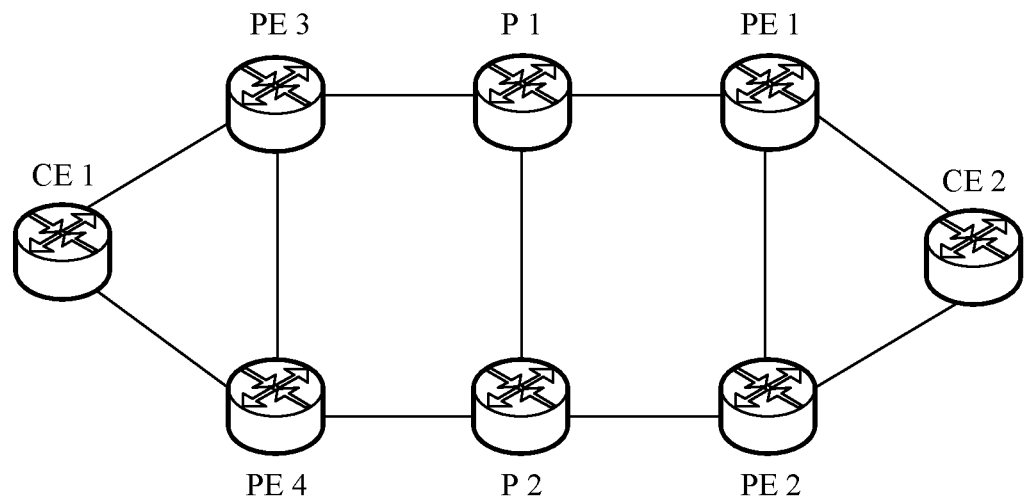
FIG. 2 is a schematic architectural diagram of a network that bears an SRv6-based VPN service according to an embodiment.

A possible SRv6-based VPN network is described in the following as an example with reference to a network scenario shown in FIG. 2. A person skilled in the art may understand that FIG. 2 is merely described by using a dual-homing scenario as an example, and should not be understood as a limitation. For example, a CE device may be multi-homed to three or more egress PE devices. Details are not described.

As shown in FIG. 2, PE 1 and PE 2 are egress PE devices, and PE 3 and PE 4 are ingress PE devices. PE 3 is connected to PE 1 by using P 1, PE 3 is connected to PE 2 by using P 1 and P 2, PE 4 is connected to PE 2 by using P 2, and PE 4 is connected to PE 1 by using P 2 and P 1. CE 1 is dual-homed to PE 3 and PE 4, and CE 2 is dual-homed to PE 1 and PE 2. CE 1 and CE 2 belong to a same VPN. It should be noted that, the ingress PE device and a source PE device are usually interchangeably used, and the egress PE device and a destination PE device are usually interchangeably used.

An SRv6 VPN SID configured in PE 1 is identified by using an IPv6 address A, and an SRv6 VPN SID configured on PE 2 is identified by using an IPv6 address B. The address A is used to identify the VPN that is in PE 1 and to which CE 2 belongs, or is used to identify an outgoing interface through which PE 1 is connected to CE 2. The address B is used to identify the VPN that is in PE 2 and to which CE 2 belongs, or is used to identify an outgoing interface through which PE 2 is connected to CE 2. The address A is different from the address B.

When sending a packet to CE 2, CE 1 first sends, to PE 3, the packet to be sent to CE 2, and PE 3 may forward, to CE 2 by using a tunneling technology such as SR-BE, the packet sent by CE 1. In the network scenario shown in FIG. 2, it is assumed that PE 3 determines to transmit, by using P 1 and PE 1, the packet sent by CE 1. After the packet is transmitted to P 1, and an outer destination address in an IPv6 packet header on an outermost side of the packet is the address A, P 1 determines a next hop node based on the outer destination address in the IPv6 packet header on the outermost side of the packet. Therefore, if PE 1 is faulty, the packet cannot be transmitted between P 1 and PE 1. Then P 1 needs to transmit, through switching, the packet on a path on which PE 4 is located. To be specific, P 1 changes the outer destination address encapsulated in the packet into the address B. After receiving the packet, PE 4 searches a corresponding VRF table based on the address B to find the VPN identified by the address B. However, because the VPN identified by the address B is different from the VPN identified by the address A in the PE 3 device, PE 4 cannot determine a correct transmission path. Consequently, PE 4 cannot continue to transmit the packet, and the packet cannot be transmitted to CE 2. As a result, multi-homing protection cannot take effect.

Therefore, to ensure that the packet can be transmitted to CE 2, when determining a packet transmission path, PE 3 further needs to detect whether an egress PE device on the path is faulty. In other words, after determining to send, by using P 1 and PE 1, the packet sent by CE 1, PE 3 needs to detect whether PE 1 is faulty. If PE 1 is faulty, PE 3 needs to perform path switching, and transmit the packet on another path through switching, to avoid a case in which the packet cannot be transmitted to CE 2 because PE 1 is faulty.

Currently, fault detection between PE devices is usually completed through configured BFD. To be specific, PE 3 determines, through BFD configured between PE 3 and PE 1, whether PE 1 is faulty. If PE 1 is faulty, path switching needs to be performed.

It can be learned from the foregoing process of packet transmission between CE 1 and CE 2 that, when determining a path for transmitting the packet sent by CE 1, PE 3 needs to configure BFD between PEs to detect whether the path is faulty, to ensure normal transmission of the packet. In this way, after a path is established between each PE device and another PE device, BFD needs to be deployed to implement rapid detection of a fault. Consequently, relatively large amount of BFD is deployed in each PE device, and excessive resources of a PE are occupied.

In addition, in the network scenario shown in FIG. 2, interface-based BFD further needs to be configured between neighboring devices, to detect whether a link between the neighboring devices is faulty. After determining to transmit, by using P 1, the packet sent by CE 1, PE 3 detects whether a link between PE 3 and P 1 is faulty through BFD configured between PE 3 and P 1. Therefore, when determining the path for transmitting the packet sent by CE 1, PE 3 needs to perform two-level fault detection. One level refers to fault detection between PE 3 and P 1, and the other level refers to fault detection between PE 3 and PE 1. In addition, usually, fault detection between PE 3 and P 1 is preferably performed, and fault detection between PE 3 and PE 1 is performed when there is no fault between PE 3 and P 1, to ensure accuracy of path fault detection. Therefore, in an entire process of completing path switching performed by PE 3, time for the two-level fault detection and path switching needs to be consumed.

For example, usually, when fault detection is performed between PE 3 and P 1, three periods are required for the detection to determine whether the link is faulty, and 10 milliseconds (ms) are required for each period. Therefore, the fault detection between PE 3 and P 1 usually needs 30 ms. When fault detection is performed between PE 3 and PE 1, a period for the fault detection between PE 3 and PE 1 is greater than the period for the fault detection between PE 3 and P 1. To be specific, at least 30 ms is required. Usually, three periods are required for the detection. Therefore, at least 90 ms needs to be consumed for the fault detection between PE 3 and PE 1. With reference to the foregoing process and the time for the path switching, at least 100 ms needs to be consumed for PE 3 to determine a fault and complete a path switching process.

In view of this, this embodiment provides a method. For example, the method may be applied to the network scenario shown in FIG. 2, to effectively reduce an amount of BFD deployed on a PE device while multi-homing protection in a network that bears an SRv6-based VPN service is implemented.

The method and an apparatus provided in this embodiment may be used in the network that bears the SRv6-based VPN service. The network may include but is not limited to a PE device, a P device, and a CE device. The PE device and the P device are in a provider network that provides SRv6-based VPN service, and the CE device is in a customer network that applies the SRv6-based VPN service. The PE device may be classified into an ingress PE device and an egress PE device based on a data transmission direction. The ingress PE device is an ingress PE device of a public network, and is connected to a source CE device based on the data transmission direction. Therefore, the ingress PE device may also be referred to as a source PE device. The egress PE is connected to a destination CE device (or referred to as a sink CE). Therefore the egress PE may also be referred to as a destination PE or a sink PE. Differentiation between the ingress PE device and the egress PE device is related to the data transmission direction. The ingress PE device may be connected to the egress PE device by using at least one P device. When being connected to the PE device, the CE device may be multi-homed to a plurality of PEs.

Specifically, the CE device may include a first CE device and a second CE device, and the first CE device and the second CE device belong to a same VPN. It is assumed that the data transmission direction indicates that the first CE device transmits data to the second CE device. The first CE device is connected to the ingress PE device, the second CE device is multi-homed to N egress PE devices, and the ingress PE device is communicatively connected to the N egress PE devices by using the at least one P device. The N egress PE devices include a first PE device and a second PE device. The at least one P device includes a first P device, the first P device is a neighboring node of the first PE device, and the first PE device is a next hop of the first P device. N is an integer greater than or equal to 2.

In this embodiment, the network that bears the SRv6-based VPN service may access a plurality of services, for example, a layer 3 VPN (L3VPN) service, an Ethernet virtual private network (EVPN) virtual private wire service (VPWS) service, and an EVPN virtual private local area network service (VPLS).

In the network that bears the SRv6-based VPN service, the PE device may be configured with one or more SRv6 VPN SIDs, and each SRv6 VPN SID is used to identify a VPN to which a CE device connected to the PE device belongs, or is used to identify an outgoing interface through which the PE device is connected to the CE device. For example, in the network architecture shown in FIG. 2, PE 1 is configured with a first SRv6 VPN SID, and the first SRv6 VPN SID is used to identify a VPN to which CE 2 belongs or an outgoing interface through which PE 1 is connected to CE 2. PE 2 is configured with a second SRv6 VPN SID, and the second SRv6 VPN SID is used to identify the VPN to which CE 2 belongs or an outgoing interface through which PE 2 is connected to CE 2. In addition, an SRv6 VPN SID configured in the PE device may be used as an IPv6 address of the PE device, and during packet transmission, a packet may be transmitted by using the SRv6 VPN SID as an IPv6 address of a corresponding PE.

It should be noted that, in this embodiment, a related description of "an SRv6 VPN SID configured in a PE device" or a related description of "an SRv6 VPN SID in a PE device" means that the PE device stores the SRv6 VPN SID. The PE device may be, for example, a router, a layer 3 switch, or a packet transport network (PTN) device, and the CE device may be, for example, a router, a layer 3 switch, a host, or a PTN device. This is not specifically limited.

The SRv6 VPN SID includes two parts: an SID segment and an index. The SID segment indicates an address of an IPv6 network segment, and the index is a value obtained through second allocation of an address in the IPv6 network segment. For example, an SID segment configured in PE 1 is 101::(64), and a configured index is 1001. Therefore, it can be learned that one SRv6 VPN SID of PE 1 is 101::1001. A plurality of indexes may be configured in the PE device. The indexes may be set based on an accessed service, for example, may be set based on VRF, a VPN instance, or a VPWS service instance. Different indexes may be combined with the SID segment to implement that different SRv6 VPN SIDs are configured for each service.

At a control layer of the network that bears the SRv6-based VPN, devices need to exchange routing information. Routing information may be exchanged between the P device and another device in a manner of advertising a route by using a public network, for example, an interior gateway protocol (IGP), a route protocol (for example, an intermediate system to intermediate system (IS-IS) protocol, open shortest path first (OSPF), or a border gateway protocol (BGP)). In addition, the routing information is advertised in a network based on, for example, shortest path algorithm topology information, to generate an SR tunnel. Routing information may be exchanged between the CE device and a PE device directly connected to the CE device by using a static route or in a manner of advertising a route through establishing a neighbor relationship. For example, an MP-BGP session may be established between PE devices, and the PE devices exchange respective VPN routes by using an MP-BGP message. The PE device directly connected to the CE device establishes a corresponding virtual routing and forwarding (VRF) table for the CE device, to store routing information of the corresponding CE device. The network architecture shown in FIG. 2 is described. A neighbor relationship may be established between CE 1 and PE 3 directly connected to CE 1, for example, the neighbor relationship is established by using a border gateway protocol (BGP) session. CE 1 advertises, by using a BGP message, routing information of CE 1 to PE 3 directly connected to CE 1, and PE 3 learn of the routing information of CE 1. By establishing an MP-BGP session between PE 3 and PE 1, PE 3 and PE 1 may exchange respective VPN route, and allocate and advertise a VPN label to each other. PE 3 advertises VPN routing information to PE 1, and advertises the VPN routing information to PE 2 by using an MP-BGP session established between PE 3 and PE 2, so that PE 1 and PE 2 learn the VPN routing information of PE 3. A neighbor relationship may also be established between PE 1 and CE 2 by using an MP-BGP, so that CE 2 learns routing information of PE 3. Similarly, a neighbor relationship may also be established between PE 2 and CE 2, so that CE 2 learns the routing information of PE 3.

The routing information advertised by each device includes IP address or media access control (MAC) address of the device, so that a device that learn the routing information can determine, based on the foregoing address, a path to the device advertising the routing information. A source IP address in routing information advertised by the PE device may be the SRv6 VPN SID configured in the PE device.

In this embodiment, to reduce an amount of BFD deployed in the PE, at least two PE devices in the PE devices multi-homed to the CE device each are configured with two SRv6 VPN SIDs, and the configured SRv6 VPN SIDs are all used to identify a VPN to which the CE belongs or an outgoing interface through which the PE device is connected to the CE device. Specifically, the first PE device is configured with the first SRv6 VPN SID, and the first SRv6 VPN SID is used to identify a VPN to which the second CE belongs or an outgoing interface through which the first PE is connected to the second CE. The second PE is configured with the second SRv6 VPN SID, and the second SRv6 VPN SID is used to identify the VPN to which the second CE belongs or an outgoing interface through which the second PE is connected to the second CE. The first SRv6 VPN SID is the same as the second SRv6 VPN SID.

For example, in the network architecture shown in FIG. 2, the SID segment of the first SRv6 VPN SID configured in PE 1 is 101::(64), and the index is 1001. Therefore, the first SRv6 VPN SID of PE 1 is 101::1001. In addition, an SID segment of a fourth SRv6 VPN SID configured in PE 1 is 555::(64), and in combination with the index 1001 configured for the first SRv6 VPN SID, it may be learned that the fourth SRv6 VPN SID is 555::1001. The first SRv6 VPN SID configured in PE 1 is the same as the second SRv6 VPN SID configured in PE 2. An SID segment of the second SRv6 VPN SID configured in PE 2 is 101::(64), and an index is 1001. Therefore, the second SRv6 VPN SID of PE 2 is 101::1001. In addition, an SID segment of a third SRv6 VPN SID configured in PE 2 is 666::(64), and in combination with the index 1001 configured for the second SRv6 VPN SID, it may be learned that the third SRv6 VPN SID of PE 2 is 666::1001.

In the process in which CE 1 sends the packet to CE 2, P1 determines the next hop node based on the first SRv6 VPN SID encapsulated in the packet. Therefore, after PE 3 determines to transmit the packet through a path 1, when the packet is transmitted to P 1, even if PE 1 corresponding to the first SRv6 VPN SID is faulty, and the packet cannot be transmitted between P1 and PE 1, P 1 may alternatively determine, based on the first SRv6 VPN SID, a path to PE 2 to transmit the packet. Therefore, P1 may transmit the packet to PE 2 through the path to PE 2, and PE 2 transmits the packet to CE 2, so that normal transmission of the packet is ensured.

In this embodiment, the second SRv6 VPN SID is the same as the first SRv6 VPN SID. Therefore, a path from another device to the first SRv6 VPN SID includes a path to the first PE device and a path to the second PE device. Therefore, when the first CE device sends a packet to the second CE device, if the path to the first PE device is faulty, the path to the second PE device may be determined based on the first SRv6 VPN SID encapsulated in the packet, and then the packet may be transmitted through the path that is to the second PE device, so that the second PE device may send the packet to the second CE device. In this way, when the first CE sends the packet to the second CE, in a process of determining a packet transmission path, an ingress PE may not detect whether an egress PE on the path is faulty. When the ingress PE detects, in a packet transmission process, that the egress PE is faulty, the packet is transmitted through a path that is to a PE which has a same SRv6 VPN SID as the egress PE, so that rapid path switching is implemented. Therefore, BFD does not need to be deployed, between PE devices that establish a path, to detect a fault, an amount of BFD deployed in the PE device is reduced, and resources that are of the PE device and that are occupied by the BFD is reduced.

In addition, in this embodiment, BFD does not need to be deployed, between PE devices that establish a path, to detect a fault, and only one-level fault detection may be required in a path switching process, that is, fault detection between P 1 and PE 1. Therefore, time for fault detection when the PE device determines a path can be reduced. In this way, time required for completing path switching can be reduced, a path switching speed is increased, and path switching performance is improved.

For example, when fault detection is performed between P 1 and PE 1, 30 ms usually needs to be consumed. In combination with time for path switching, compared with the foregoing two-level fault detection manner, at least 50 ms may be saved after P 1 determines a fault and completes a path switching process. Therefore, a path switching speed is increased, and path switching performance is improved.

The following separately describes the embodiments from a control layer and a forwarding layer.

Figure 3:
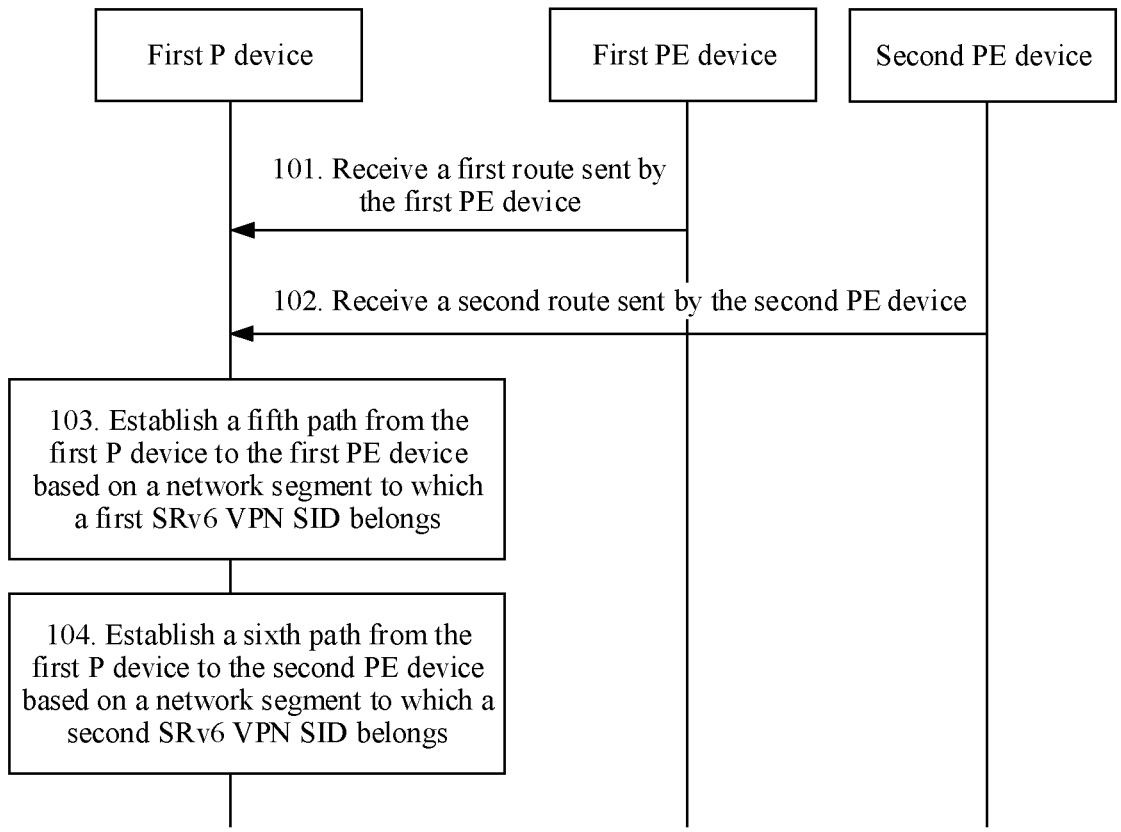
FIG. 3 is a schematic flowchart of a route processing method according to an embodiment.

An embodiment provides a route processing method. The method is applied to a control layer of the network that bears the SRv6-based VPN service, and may be specifically applied to a control layer of the network architecture shown in FIG. 2. As shown in FIG. 3, the method includes the following steps.

101. A first P device receives a first route sent by a first PE device.

The first route includes a network segment to which a first SRv6 VPN SID belongs. In this embodiment, the network that bears the SRv6-based VPN service is applied. Therefore, a network segment to which an SRv6 VPN SID belongs is an IPv6 network segment. The SRv6 VPN SID includes two parts: an SID segment and an index. The SID segment indicates an address of the IPv6 network segment. Therefore, the network segment to which the first SRv6 VPN SID belongs is an SID segment of the first SRv6 VPN SID configured in the first PE device.

Devices need to exchange routing information to determine a path to each other. Routing information may be exchanged between a P device and another device in a manner of advertising a route by using a public network. Therefore, the first P device receives a route sent by another device, and the route includes an address of a corresponding device. For example, the first PE device sends the first route to the first P device, and the first route includes the network segment to which the first SRv6 VPN SID of the first PE device belongs. The first P device receives the first route that is sent by the first PE device and that includes the network segment to which the first SRv6 VPN SID belongs.

102. The first P device receives a second route sent by a second PE device.

The second route includes a network segment to which a second SRv6 VPN SID belongs. According to a principle that is the same as that of step 101, the first P device also receives the second route that is sent by the second PE device and that includes the network segment to which the second SRv6 VPN SID belongs.

103. The first P device establishes a fifth path from the first P device to the first PE device based on the network segment to which the first SRv6 VPN SID belongs.

After receiving the first route sent by the first PE device, the first P device determines, from the first route, the network segment to which the first SRv6 VPN SID belongs, and then establishes the fifth path from the first P device to the first PE device based on the network segment to which the first SRv6 VPN SID belongs. When a packet is subsequently transmitted to a second CE by using the first P device, it may be determined, according to a longest match principle and based on an outer destination address of the packet and the network segment to which the first SRv6 VPN SID belongs, that the packet is transmitted to the first PE through the fifth path, so that the first PE forwards the packet to the second CE.

104. The first P device establishes a sixth path from the first P device to the second PE device based on the network segment to which the second SRv6 VPN SID belongs.

After receiving the second route sent by the second PE device, the first P device determines, from the second route, the network segment to which the second SRv6 VPN SID belongs, and then establishes the sixth path from the first P device to the second PE device based on the network segment to which the second SRv6 VPN SID belongs. When a packet is subsequently transmitted to the second CE by using the first P device, the packet may be transmitted to the second PE through the sixth path, so that the second PE forwards the packet to the second CE.

In this embodiment, because the first SRv6 VPN SID is the same as the second SRv6 VPN SID, and the network segment to which the first SRv6 VPN SID belongs is also the same as the network segment to which the second SRv6 VPN SID belongs, the fifth path and the sixth path that are established by the first P device arrive at a same network segment. Therefore, when a data forwarding layer of the first P device forwards a packet whose destination address is the first SRv6 VPN SID, two paths may be used for forwarding. A control layer of the first P device delivers one path to the forwarding layer, so that the data forwarding layer of the first P device forwards the packet through the path delivered by the control layer. Because the first PE is a neighboring node of the first PE device, and the first PE device is a next hop of the first P device, usually, the control layer of the first P device selects the fifth path. However, when the fifth path is faulty, the sixth path is used as a standby path. In other words, the first P device forwards the packet to the second CE device on the sixth path through switching.

In the foregoing process, the first P device separately receives the route sent by the first PE device and the route sent by the second PE device. At a control layer, another P device also receives, according to a same principle, a route sent by the first PE device and a route sent by the second PE device, and establishes a corresponding path used to transmit a packet. In addition, the first PE device and the second PE device further send VPN routes to another PE device (for example, an ingress PE device), and a specific VPN route may also be carried in an MP-BGP message and then sent to another PE device. For example, the second PE device may send a first VPN route to the ingress PE device, and the first VPN route includes the second SRv6 VPN SID. The first PE device may send a second VPN route to the ingress PE device, and the second VPN route includes the first SRv6 VPN SID. After receiving the first VPN route and the second VPN route, the ingress PE device establishes a path to the first PE device based on the first SRv6 VPN SID, and establishes a path to the second PE device based on the second SRv6 VPN SID. Because the first SRv6 VPN SID is the same as the second SRv6 VPN SID, when a data forwarding layer of the ingress PE device forwards a packet whose destination address is the first SRv6 VPN SID, two paths may be used for forwarding, and a control layer of the ingress PE device delivers one path to the forwarding layer.

A transmission path may be established between devices based on a process in which routing information is exchanged at the control layer. Based on the foregoing embodiment, multi-homing protection may be implemented in a process in which a first CE device sends a first packet to the second CE device, so that the first packet is transmitted to the second CE device.

Figure 4:
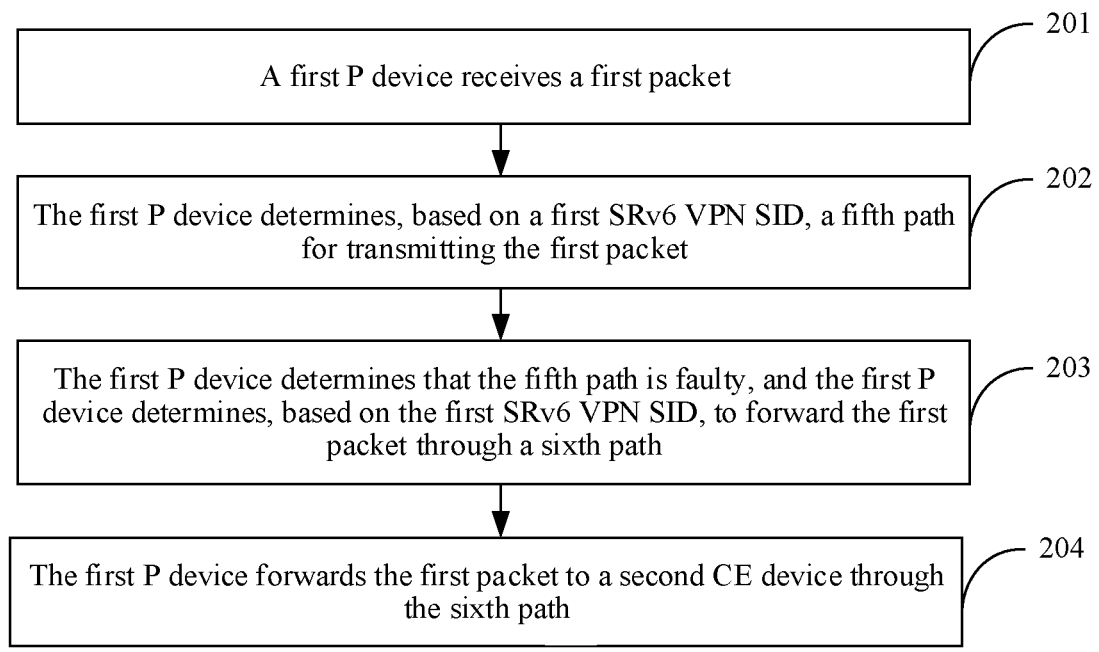
FIG. 4 is a schematic flowchart of a data transmission method according to an embodiment.

Specifically, an embodiment provides a data transmission method. The method is applied to a data forwarding layer of an SRv6-based VPN, and specifically applied to a data forwarding layer of the network architecture shown in FIG. 2. As shown in FIG. 4, the method includes the following steps.

201. A first P device receives a first packet.

The first packet is sent by a first CE device to a second CE device, and an outer destination address encapsulated in the first packet is a first SRv6 VPN SID.

In the network based on the SRv6-based VPN service, the data forwarding layer is used to forward a packet transmitted between two CEs. In this embodiment, that the first CE device sends the first packet to the second CE device is used as an example.

In this embodiment, the first CE device sends the first packet to an ingress PE device (for example, PE 3 in FIG. 2). In this case, the first packet includes a source CE address and a destination CE address. The source CE address is an address of the first CE device, and the destination CE address is an address of the second CE device. After the ingress PE device receives the first packet, a control layer of the ingress PE device may determine, based on the destination CE address and VRF corresponding to the first CE device, a path for transmitting the first packet, and deliver the determined path to a data forwarding layer of the ingress PE device. The data forwarding layer of the ingress PE device may encapsulate the first packet based on the determined path and by using a tunneling technology such as SR-BE, and forward the encapsulated first packet.

In this embodiment, the ingress PE device determines that an egress PE device on the path for transmitting the first packet is a first PE device, an address of the first PE device is the first SRv6 VPN SID, and the first packet arrives at the first P device through transmission. Therefore, when the first P device receives the first packet, the outer destination address encapsulated in the first packet is the first SRv6 VPN SID. The first P device determines, based on the outer destination address of the first packet, that the first packet needs to be sent to a device whose address is the first SRv6 VPN SID. Therefore, the first P device may determine, based on the first SRv6 VPN SID, the path for transmitting the first packet.

202. The first P device determines, based on the first SRv6 VPN SID, a fifth path for transmitting the first packet.

The fifth path is from the first P device to the first PE.

It can be learned from step 103 that, after receiving the first route sent by the first PE device, the first P device establishes the fifth path to the first PE device based on the network segment to which the first SRv6 VPN SID belongs. In this step, the fifth path for transmitting the first packet is determined according to a longest match principle and based on the outer destination address of the first packet, namely, the first SRv6 VPN SID.

It should be noted that, because the first SRv6 VPN SID of the first PE device is the same as a second SRv6 VPN SID of a second PE device, and a network segment to which the first SRv6 VPN SID belongs is also the same as a network segment to which the second SRv6 VPN SID belongs, there are two paths from the first device to the first SRv6 VPN SID. One is the fifth path from the first P device to the first PE device, and the other is a sixth path from the first P device to the second PE device. Because the first PE device is a next hop of the first P device, usually, the first P device transmits the first packet through the fifth path. Therefore, in this embodiment, the first P device determines, based on the destination address of the first packet, the fifth path from the first P device to the first PE device, to transmit the first packet.

203. The first P device determines that the fifth path is faulty, and the first P device determines, based on the first SRv6 VPN SID, to forward the first packet through the sixth path.

The first P device is connected to the second PE by using the sixth path.

In the network based on the SRv6-based VPN service, fault detection also needs to be performed when data is transmitted between neighboring devices. Usually, BFD is configured between the neighboring devices to perform rapid path fault detection. The next hop of the first P device is the first PE device. After determining the fifth path from the first P device to the first PE based on the first SRv6 VPN SID, the first P device may detect whether the fifth path is faulty by using BFD configured between the first P device and the first PE device. If the first P device detects that the fifth path is faulty, the first P device needs to perform path switching. To be specific, the first P device determines, based on the first SRv6 VPN SID and according to the longest match principle, the sixth path to the second PE device to transmit the first packet.

It should be noted that, when determining to transmit the first packet through the sixth path that is to the second PE, the first P device may further perform path fault detection on a path from the first P device to the next hop, to ensure that the first packet can be normally transmitted to the next hop.

204. The first P device forwards the first packet to the second CE device through the sixth path.

After determining, in step 203, to transmit the first packet through the sixth path, the first P device transmits the first packet on the sixth path through switching.

In this case, the first P device may determine, based on the sixth path, an outgoing interface connected to the next hop, and then forward the encapsulated first packet by using the outgoing interface connected to the next hop. Because the second SRv6 VPN SID of the second PE device is the same as the first SRv6 VPN SID, and a VPN identified by the second SRv6 VPN SID is the same as a VPN identified by the first SRv6 VPN SID, after the first packet is transmitted to the second PE device, the second PE device may search a corresponding VRF table based on the outer destination address encapsulated in the first packet, namely, the first SRv6 VPN SID, and then determine a correct path for transmitting the first packet. Further, the second PE device may send the first packet to the second CE device, so that multi-homing protection takes effect, and accurate packet transmission is ensured.

In this embodiment, the second SRv6 VPN SID is the same as the first SRv6 VPN SID. Therefore, a path from the first P device to the first SRv6 VPN SID includes a path to the first PE device and a path to the second PE device. Therefore, when a packet sent by the first CE device to the second CE device is transmitted, if the fifth path from the first P device to the first PE is faulty, the first P device may determine the sixth path to the second PE device, and further transmit the packet to the second PE device on the sixth path through switching, so that the second PE device may send the packet to the second CE device.

In this way, when the first CE device sends a packet to the second CE device, in a process of determining a packet transmission path, the ingress PE device may not detect whether an egress PE device on the path is faulty. When the ingress PE device detects, in a packet transmission process, that the egress PE device is faulty, the packet is transmitted through a path that is to a PE device which has a same SRv6 VPN SID as the egress PE device, so that rapid path switching is implemented. Therefore, BFD does not need to be deployed, between PE devices that establish a path, to detect a fault. To be specific, BFD does not need to be deployed between the ingress PE device and the egress PE device to detect a fault. Therefore, an amount of BFD deployed in a PE device is reduced, resources that are of the PE device and that are occupied by the BFD is reduced, time for fault detection is reduced when the PE device determines a path, and a path switching speed is increased.

Based on this embodiment, the second SRv6 VPN SID is the same as the first SRv6 VPN SID, and the network segment to which the first SRv6 VPN SID belongs is also the same as the network segment to which the second SRv6 VPN SID belongs. When a packet sent by the first CE device to the second CE device is transmitted, if the fifth path from the first P device to the first PE is faulty, the first P device may determine the sixth path to the second PE device, so that the second PE device sends the packet to the second CE device. When the fifth path from the first P device to the first PE device is not faulty, the first P device sends the first packet to the first PE device. When determining to transmit the first packet to the second CE device, the first PE device determines a first path directly connected to the first PE device and the second CE device to forward the first packet. In this case, the first PE device further needs to detect whether the first path directly connected to the first PE device and the second CE device is faulty. If the first path is faulty, path switching needs to be performed. To be specific, the first packet is transmitted, through switching, on a second path connected to the second PE device and the second CE device. However, because the second SRv6 VPN SID is the same as the first SRv6 VPN SID, the first PE device cannot implement path switching for the first packet. Consequently, multi-homing path protection cannot be implemented.

Based on the foregoing problem, in this embodiment, at least two PE devices in PE devices multi-homed to a CE device each are configured with a bypass SRv6 VPN SID, and the at least two PE devices are configured with different bypass SRv6 VPN SIDs separately. The bypass SRv6 VPN SIDs configured for the at least two PE devices are alternatively used to identify a VPN to which the CE belongs or an outgoing interface connected to the CE device. A path may be established between the at least two PE devices based on the bypass SRv6 VPN SIDs. Specifically, the first PE device is configured with the first SRv6 VPN SID and a fourth SRv6 VPN SID, and both the first SRv6 VPN SID and the fourth SRv6 VPN SID are used to identify a VPN to which the second CE belongs or an outgoing interface through which the first PE is connected to the second CE. The second PE is configured with the second SRv6 VPN SID and a third SRv6 VPN SID, and both the second SRv6 VPN SID and the third SRv6 VPN SID are used to identify the VPN to which the second CE belongs or an outgoing interface through which the second PE is connected to the second CE. The third SRv6 VPN SID and the fourth SRv6 VPN SID are bypass SRv6 VPN SIDs, the first SRv6 VPN SID is the same as the second SRv6 VPN SID, the first SRv6 VPN SID is different from the fourth SRv6 VPN SID, the fourth SRv6 VPN SID is different from the third SRv6 VPN SID, and the third SRv6 VPN SID is different from the second SRv6 VPN SID.

The following separately describes this embodiment from a control layer and a forwarding layer.

In the network that bears the SRv6-based VPN service, routing information needs to be exchanged between devices at the control layer. The embodiment shown in FIG. 3 describes a process in which the first PE device and the second PE device send routes to the first P device. In this embodiment, because the first PE device and the second PE device each are configured with the bypass SRv6 VPN SID, the sent routes further carry a network segment to which the respective bypass SRv6 VPN SID belongs. The first route sent by the first PE device includes the network segment to which the first SRv6 VPN SID belongs and a network segment to which the fourth SRv6 VPN SID belongs. After receiving the first route, the first P device establishes a path between the first P device and the first PE device based on the network segment to which the first SRv6 VPN SID belongs and a path between the first P device and the first PE device based on the network segment to which the fourth SRv6 VPN SID belongs. A second route sent by the second PE device includes the network segment to which the second SRv6 VPN SID belongs and a network segment to which the third SRv6 VPN SID belongs. After receiving the second route, the first P device establishes a path between the first P device and the second PE device based on the network segment to which the second SRv6 VPN SID belongs and a path between the first P device and the second PE device based on the network segment to which the third SRv6 VPN SID belongs. In this embodiment, because the first PE device and the second PE device each are configured with the bypass SRv6 VPN SID, a VPN route sent by the first PE device to PE devices is different from a VPN route sent by the second PE device to the PE devices. In the following, a process in which a VPN route is sent between the first PE device and the second PE device is used as an example for description.

Figure 5:
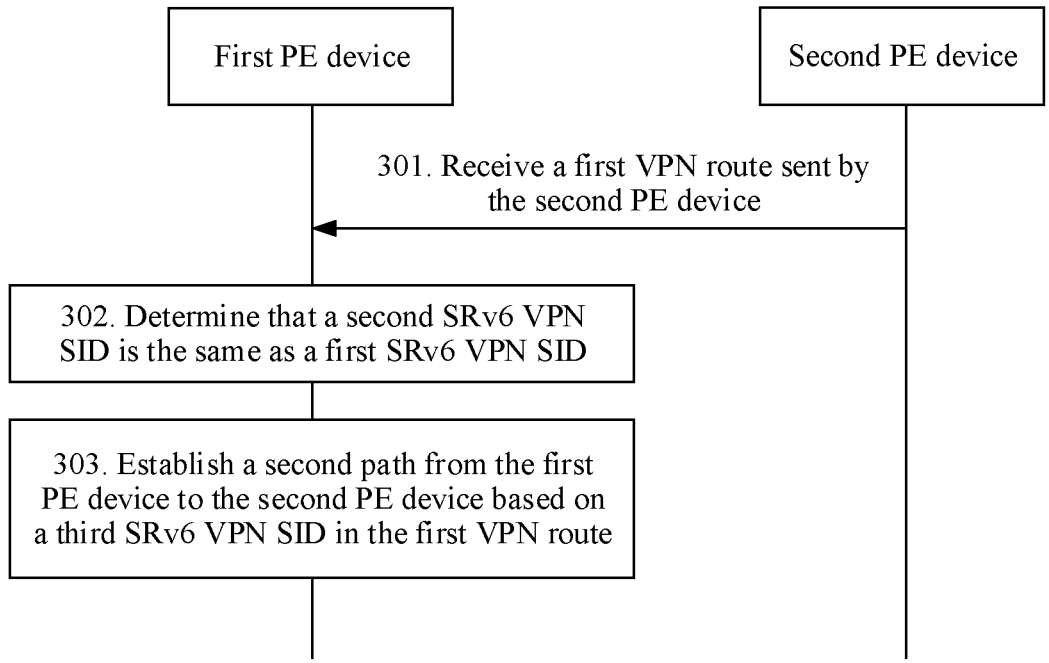
FIG. 5 is a schematic flowchart of a route processing method according to another embodiment.

An embodiment provides another route processing method. The method is applied to a control layer of the network that bears the SRv6-based VPN service, and specifically applied to a control layer of the network architecture shown in FIG. 2. As shown in FIG. 5, the method includes the following steps.

301. A first PE device receives a first VPN route sent by a second PE device.

The first VPN route includes a second SRv6 VPN SID and a third SRv6 VPN SID.

In a network that bears an SRv6-based VPN service, routing information needs to be exchanged between PE devices at a control layer. To be specific, the first PE device advertises a VPN route of the first PE device to the second PE device, and the second PE device also advertises a VPN route of the second PE device to the first PE device. Each of the PE devices usually advertises respective VPN route to each other by using an MP-BGP message. A VPN route advertised by each PE device includes an SRv6 VPN SID of the PE device.

The first PE device and the second PE device are multihomed to a second CE device. In this embodiment, the first PE device and the second PE device each are configured with two SRv6 VPN SIDs. The first PE device is configured with a first SRv6 VPN SID and a fourth SRv6 VPN. Both the first SRv6 VPN SID and the fourth SRv6 VPN SID are used to identify a VPN to which the second CE device belongs or an outgoing interface through which the first PE device is connected to the second CE device. The second PE device is configured with the second SRv6 VPN SID and the third SRv6 VPN SID. Both the second SRv6 VPN SID and the third SRv6 VPN SID are used to identify the VPN to which the second CE device belongs or an outgoing interface through which the second PE device is connected to the second CE device. The third SRv6 VPN SID and the fourth SRv6 VPN SID are bypass SRv6 VPN SIDs. In addition, the first SRv6 VPN SID is the same as the second SRv6 VPN SID, the fourth SRv6 VPN SID is different from the third SRv6 VPN SID, the fourth SRv6 VPN SID is different from the first SRv6 VPN SID, and the second SRv6 VPN SID is different from the third SRv6 VPN SID.

When the first PE device advertises a VPN route, the VPN route includes the first SRv6 VPN SID and the fourth SRv6 VPN SID. When the second PE device advertises a VPN route, the VPN route includes the second SRv6 VPN SID and the third SRv6 VPN SID.

Specifically, the first VPN route may be carried in a BGP-Prefix-SID attribute field of the MP-BGP message.

Figure 6:
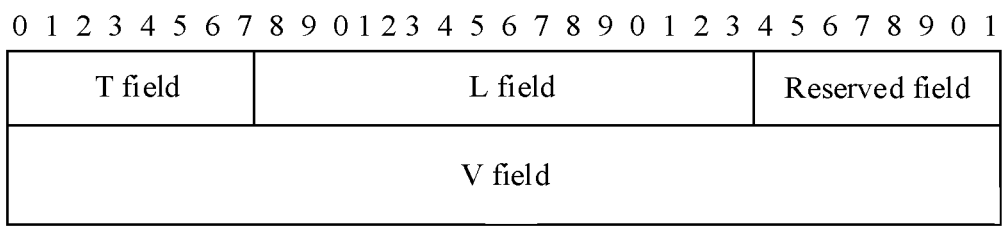
FIG. 6 is a schematic diagram of a field in a BGP-Prefix-SID property according to another embodiment.

The BGP-Prefix-SID attribute field includes an SRv6-VPN SID TLV field. The SRv6-VPN SID TLV field includes a T field, an L field, a V field, and a reserved field. A specific structure may be shown in FIG. 6. The T field is used to indicate a type of a carried SRv6-VPN SID. The L field is used to indicate a total length of the V field, and is usually 16 bytes. The V field carries specific SRv6-VPN SID information. The reserved field should be filled as 0 when the MP-BGP message is sent, and may be ignored when the MP-BGP message is received. The reserved field is usually eight bytes.

It should be noted that, in an SRv6-based VPN, a function of the T field may be equivalent to a function of a VPN MPLS label attribute in a route including a multi-protocol label switching (MPLS) label, and may alternatively be equivalent to a function of a VPN MPLS label attribute in a route including an EVPN.

In this embodiment, the first VPN route includes the second SRv6 VPN SID and the third SRv6 VPN SID. Therefore, after the second SRv6 VPN SID is carried in the BGP-Prefix-SID attribute field, a new field further needs to be extended in the BGP-Prefix-SID attribute field to carry the third SRv6 VPN SID.

In a specific implementation, a TLV field may be extended to carry the third SRv6 VPN SID. A type T field in the TLV field is used to indicate a type of the third SRv6 VPN SID. Specifically, the T field may be used to indicate that the third SRv6 VPN SID is a bypass SRv6 VPN SID, and is used to indicate that when a fault occurs between the first PE and the second CE or a fault occurs in the second CE, the first PE device is instructed to forward a packet through a path between the first PE device and the second PE device. The second PE device is configured with the third SRv6 VPN SID. A length L field in the TLV field is used to identify a length of the third SRv6 VPN SID, and a value V field in the TLV field is a value of the third SRv6 VPN SID.

In this embodiment, when the third SRv6 VPN SID is carried in the BGP-Prefix-SID attribute field, different types may be set for the second SRv6 VPN SID and the third SRv6 VPN SID. For example, a type of the second SRv6 VPN SID is set to 1, and a type of the third SRv6 VPN SID is set to 2. When receiving the MP-BGP message, the first PE device may identify a type of an SRv6 VPN SID based on different TLV fields in the BGP-Prefix-SID attribute field, to distinguish between the second SRv6 VPN SID and the third SRv6 VPN SID.

It should be noted that, in this embodiment, the third SRv6 VPN SID may be alternatively carried in an NLRI field of the MP-BGP message.

MP_REACH_NLRI may be understood as multiprotocol extensions attribute information of NLRI, and includes three parts: an address family information field, a next hop information field, and a network layer reachability information (NLRI) field.

The address family information field includes an address family identifier field (two bytes) and a subsequent address family identifier field (one byte). An address family identifier (AFI) is used to identify a network layer protocol. For example, if the AFI is set to 1, it indicates IPv4; and if the AFI is set to 2, it indicates IPv6. A SAFI identifies a type of a subsequent address family. For example, if the SAFI is set to 1, it indicates unicast; if the SAFI is set to 2, it indicates multicast; and if the SAFI is set to 128, it indicates a VPN. More specifically, if an AFI value is 1 and a SAFI value is 1, it indicates that an NLRI field carries an IPv4 unicast route. If the AFI value is 1 and the SAFI value is 128, it indicates that the NLRI field carries a BGP-VPNv4 route. If the AFI value is 1, and the SAFI value is 4, it indicates that the NLRI field carries a BGP label route.

A BGP synchronized address family may be understood as an extended subsequent address family in an IPv4 address family or an IPv6 address family in an existing BGP protocol. To be specific, the AFI value may be 1 or 2. The SAFI value may be determined based on a standard stipulated by the IETF.

The next hop information field includes an address length field of a next hop (one byte) and an address field of the next hop (a variable length). The address length field of the next hop is used to identify a length of the address field of the next hop, and the length of the address field of the next hop is determined by using the length identified by the address length field of the next hop.

One-byte reserved field is reserved between the next hop information field and the NLRI field.

The NLRI field includes the NLRI field.

The NLRI field may include, for example, a TLV field (a variable length). The TLV field may include a T field, an L field, and a V field. The T field is used to indicate the type of the carried third SRv6 VPN SID. The L field is used to indicate a total length of the carried third SRv6 VPN SID, and is usually 16 bytes. The V field carries the third SRv6 VPN SID.

A person skilled in the art may understand that the third SRv6 VPN SID may be carried in another manner, and details are not described again.

302. The first PE device determines that the second SRv6 VPN SID is the same as the first SRv6 VPN SID.

In this embodiment, at least two PE devices in PE devices multi-homed to a CE device are configured with a same SRv6 VPN SID, and the SRv6 VPN SID is used to identify a VPN that is of the PE device and to which the CE belongs or an outgoing interface through which the PE device is connected to the CE device. Therefore, after receiving the first VPN route sent by the second PE device, the first PE device may determine that the second SRv6 VPN SID in the first VPN route is the same as the first SRv6 VPN SID of the first PE device. Therefore, the first PE device may determine that the second PE device is also connected to the second CE device. Further, it may be determined that the second CE device is multi-homed to the first PE device and the second PE device.

303. The first PE device establishes a second path from the first PE device to the second PE device based on the third SRv6 VPN SID in the first VPN route.

When a first path directly connected to the first PE device and the second CE device is faulty, the second path is used by the first PE device to forward a packet to the second CE device.

Because the first SRv6 VPN SID of the first PE device is the same as the second SRv6 VPN SID of the second PE device, the first PE device needs to establish a path between the first PE device and the second PE device based on the third SRv6 VPN SID of the second PE device, and the second PE device establishes a path between the second PE device and the first PE device based on the fourth SRv6 VPN SID of the first PE device, so that data may be transmitted between the first PE device and the second PE device.

Therefore, after determining that the second SRv6 VPN SID is the same as the first SRv6 VPN SID, the first PE device establishes the second path from the first PE device to the second PE device based on the third SRv6 VPN SID in the first VPN route. In this way, when the first PE device sends a packet to the second CE device, if the first path directly connected to the first PE device and the second CE device is faulty, the first PE device may transmit the packet on the second path through switching, so that the second PE device transmits the packet to the second CE device.

In this embodiment, the second PE device is configured with the third SRv6 VPN SID that is different from the second SRv6 VPN SID, so that the first PE device may establish the second path based on the third SRv6 VPN SID. In this way, when a path directly connected to the first PE device and the second CE device is faulty, the packet transmitted by the first PE device to the second CE device may be transmitted on the second path through switching. Therefore, rapid path switching is implemented, the packet can be transmitted to the second CE device, and multi-homing protection is implemented.

It should be noted that, the first PE device may generate fast reroute (FRR) information based on the third SRv6 VPN SID in the first VPN route and a route sent by the second CE device, to implement fast reroute in a process in which the first PE device is transmitting the packet.

Based on the method shown in FIG. 5, this embodiment may further include the following step: The first PE device sends a second VPN route to the second PE device.

The second VPN route carries the first SRv6 VPN SID and the fourth SRv6 VPN SID. The fourth SRv6 VPN SID is used to identify the VPN to which the second CE device belongs or the outgoing interface through which the first PE is connected to the second CE, and the fourth SRv6 VPN SID is used by the second PE device to establish a third path from the second PE device to the first PE device. When a fourth path directly connected to the second PE device and the second CE device is faulty, the third path is used by the second PE device to transmit a packet to the second CE device. The fourth SRv6 VPN SID is different from the first SRv6 VPN SID, and the first SRv6 VPN SID is the same as the second SRv6 VPN SID stored in the second PE device.

At a control layer, the first PE device also needs to send a VPN route, namely, the second VPN route, to the second PE device. The second VPN route includes the first SRv6 VPN SID and the fourth SRv6 VPN SID that are configured in the first PE device. The second VPN route may also be carried in an MP-BGP message and then sent to the second PE device. A manner of carrying the second VPN route is the same as a manner of carrying the first VPN route, and details are not described herein again.

After receiving the second VPN route, the second PE device may determine that the first SRv6 VPN SID is the same as the second SRv6 VPN SID. Therefore, it may be determined that the first PE device is also connected to the second CE. Further, it may be determined that the second CE device is multi-homed to the first PE device and the second PE device. Therefore, the second PE device may establish the third path from the second PE device to the first PE device based on the fourth SRv6 VPN SID. In this way, when the second PE device sends a packet to the second CE device, if the fourth path directly connected to the second PE device and the second CE device is faulty, the second PE device may transmit the packet on the third path through switching, so that the first PE device transmits the packet to the second CE device. Therefore, rapid path switching is implemented.

In this embodiment, at the control layer, the first PE device and the second PE device further need to send VPN routes to another PE device (for example, an ingress PE device). For example, the first PE device sends a VPN route to another PE device. The VPN route sent by the first PE device to the another PE device is the second VPN route, and the second VPN route includes the first SRv6 VPN SID and the fourth SRv6 VPN SID. After receiving the second VPN route, the another PE device may compare the first SRv6 VPN SID with an SRv6 VPN SID configured in the another PE device, to determine whether the first SRv6 VPN SID is the same as the SRv6 VPN SID configured in the another PE device. If the first SRv6 VPN SID is the same as the SRv6 VPN SID configured in the another PE device, a path between the another PE device and the first PE device is established based on the fourth SRv6 VPN SID. If the first SRv6 VPN SID is different from the SRv6 VPN SID configured in the another PE device, a path between the another PE device and the first PE device is established based on the first SRv6 VPN SID.

The second VPN route sent by the first PE device to the another PE device may also be carried in an MP-BGP message and then sent to the another PE device.

It should be noted that, when determining that the first SRv6 VPN SID is different from the SRv6 VPN SID configured in the another PE device, the another PE device may alternatively establish the path between the another PE device and the first PE device based on the fourth SRv6 VPN SID. However, when the another PE device transmits data to the first PE device, the first SRv6 VPN SID is usually used as an address of the first PE device. Therefore, the another PE device uses the path that is between the another PE device and the first PE device and that is established based on the first SRv6 VPN SID for transmission, instead of using the path that is between the another PE device and the first PE device and that is established based on the fourth SRv6 VPN SID for transmission.

In this embodiment, at a control layer of the SRv6-based VPN, each device may alternatively advertise a route by using a public network, so that a P device and another device may exchange routing information.

In this embodiment, according to a process in which routing information is exchanged at the control layer, a data transmission path may be established between devices to transmit data. In this embodiment, at least two PE devices in PE devices multi-homed to a CE device each are configured with a bypass SRv6 VPN SID, and a path may be established between the at least two PE devices based on the bypass SRv6 VPN SID. Therefore, multi-homing path protection is implemented. In the following, a process in which the first PE device sends a first packet to the second CE device is used as an example.

Figure 7:
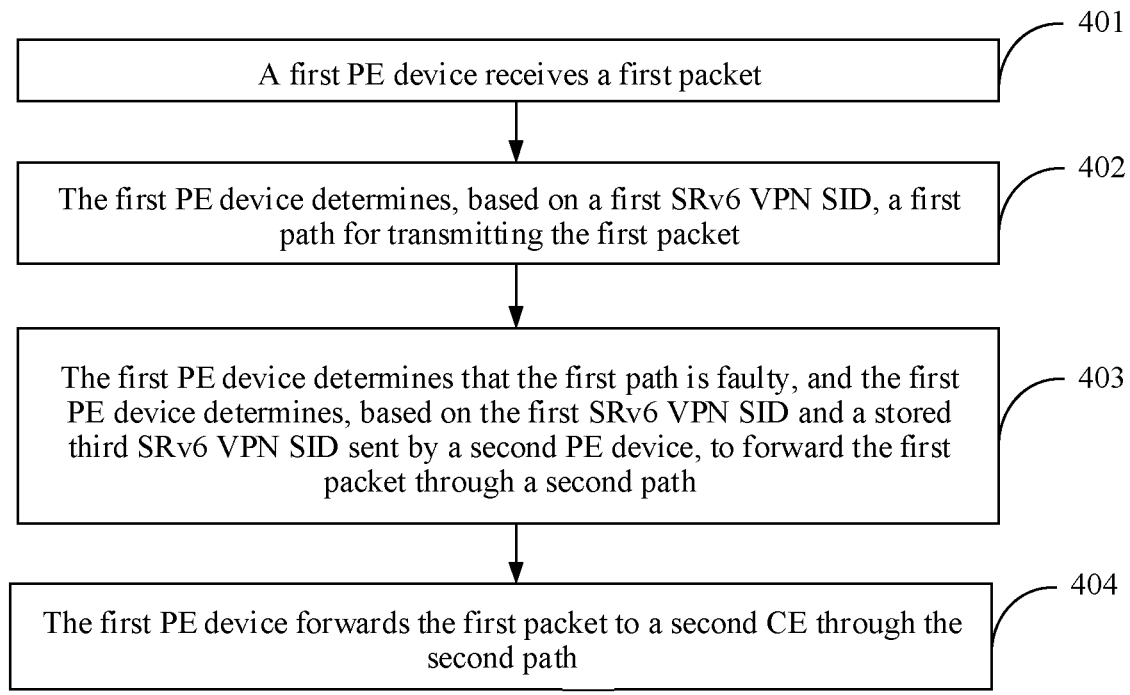
FIG. 7 is a schematic flowchart of a data transmission method according to another embodiment.

Another embodiment provides a data transmission method. The method is applied to a data forwarding layer of the network based on an SRv6-based VPN, and specifically applied to the data forwarding layer of the network architecture shown in FIG. 2. As shown in FIG. 7, the method includes the following steps.

401. A first PE device receives a first packet.

The first packet is sent by a first CE device to a second CE device.

In this embodiment, the first CE device sends the first packet to an ingress PE device. In this case, the first packet includes a source CE address and a destination CE address. The source CE address is an address of the first CE device, and the destination CE address is an address of the second CE device. After receiving the first packet, the ingress PE device determines, based on the destination CE address and VRF corresponding to the first CE device, a path for transmitting the first packet. The ingress PE device sends the first packet to the first PE device by using a first P device, and the first PE device receives the first packet. An outer destination address encapsulated in the first packet is a first SRv6 VPN SID.

402. The first PE device determines, based on the first SRv6 VPN SID, a first path for transmitting the first packet.

The first path is directly connected to the first PE device and the second CE device.

After receiving the first packet, the first PE device may query a corresponding VRF table based on the first SRv6 VPN SID encapsulated in the first packet, to determine a VPN identified by the first SRv6 VPN SID or an outgoing interface connected to the second CE device, and further determine the first path for sending the first packet to the second CE device.

Because the first PE device is directly connected to the second CE device, usually, the first PE device determines to transmit the first packet through the first path directly connected to the first PE device and the second CE device. Therefore, after receiving the first packet, the first PE device may determine the first path directly connected to the first PE device and the second CE device.

403. The first PE device determines that the first path is faulty, and the first PE device determines, based on the first SRv6 VPN SID and a stored third SRv6 VPN SID sent by a second PE device, to forward the first packet through a second path.

The first PE device is connected to the second PE device by using the second path.

When determining the first path, the first PE device also detects whether the first path is faulty, to avoid a case in which the first packet cannot be transmitted to the second CE device due to a fault of the first path.

If the first PE device detects that the first path is faulty, path switching needs to be performed. A path from the first PE device to the second CE device further includes the second path that is established based on the third SRv6 VPN SID of the second PE device and that is from the first PE device to the second PE device. Therefore, in this case, the first PE device may transmit, through switching, the first packet on the second path that is from the first PE device to the second PE device, and forward the first packet to the second CE device by using the second PE device.

404. The first PE device forwards the first packet to the second CE through the second path.

In this step, after determining to transmit the first packet on the second path through switching, the first PE device determines that a next hop is the second PE device, and an address of the next hop is the third SRv6 VPN SID of the second PE device. Therefore, the outer destination address encapsulated in the first packet may be changed into the third SRv6 VPN SID, and the encapsulated first packet is sent to the second PE device by using the outgoing interface connected to the second PE device. After receiving the encapsulated first packet, the second PE device decapsulates the first packet, and then sends the first packet to the second CE device.

In this embodiment, the first PE device establishes the second path to the second PE device based on the third SRv6 VPN SID. In this way, when a path directly connected to the first PE device and the second CE device is faulty, a packet transmitted by the first PE device to the second CE device may be transmitted on the second path through switching. Therefore, rapid path switching and multi-homing protection are implemented, and the packet can be transmitted to the second CE device.

Figure 8:
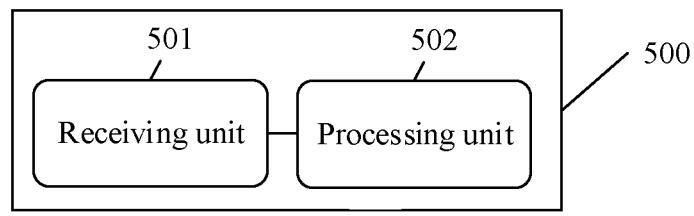
FIG. 8 is a schematic block diagram of a PE device according to an embodiment.

FIG. 8 is a schematic block diagram of a PE device 500 according to an embodiment.

The PE device 500 is used as a first PE device, and is used in a network that bears an SRv6-based VPN service. The network includes a first CE device, a second CE device, an ingress PE device, N egress PE devices, and at least one P device. The first CE device is connected to the ingress PE device, and the second CE device is multi-homed to the N egress PE devices. The ingress PE device is communicatively connected to the N egress PE devices by using the at least one P device, and the first CE device and the second CE device belong to a same VPN. The N egress PE devices include a first PE device and a second PE device. The first PE device is configured with a first SRv6 VPN SID, and the first SRv6 VPN SID is used to identify the VPN to which the second CE device belongs or an outgoing interface through which the first PE is connected to the second CE device. The second PE device is configured with a second SRv6 VPN SID and a third SRv6 VPN SID, and both the second SRv6 VPN SID and the third SRv6 VPN SID are used to identify the VPN to which the second CE device belongs or an outgoing interface through which the second PE device is connected to the second CE device. N is an integer greater than or equal to 2.

As shown in FIG. 8, the PE device 500 may include a receiving unit 501 and a processing unit 502.

The receiving unit 501 is configured to receive a first VPN route sent by the second PE device, and the first VPN route includes the second SRv6 VPN SID and the third SRv6 VPN SID.

The processing unit 502 is configured to determine that the second SRv6 VPN SID is the same as the first SRv6 VPN SID.

The processing unit 502 is further configured to establish a second path from the first PE device to the second PE device based on the third SRv6 VPN SID in the first VPN route, and when a first path directly connected to the first PE device and the second CE device is faulty, the second path is used by the first PE device to forward a packet to the second CE device.

In this embodiment, the second SRv6 VPN SID is the same as the first SRv6 VPN SID. Therefore, a path to the first SRv6 VPN SID includes a path to the PE device 500 and a path to the second PE device. Therefore, when a packet sent by the first CE device to the second CE device is transmitted, if a fifth path to the PE device 500 is faulty, a sixth path to the second PE device may be determined. Further, the packet may be transmitted to the second PE device on the sixth path through switching, so that the second PE device may send the packet to the second CE device. In this way, when the first CE device sends the packet to the second CE device, in a process of determining a packet transmission path, an ingress PE device may not detect whether an egress PE device on the path is faulty. When the ingress PE device detects, in a packet transmission process, that the egress PE device is faulty, the packet is transmitted through a path that is to a PE device which has a same SRv6 VPN SID as the egress PE device, so that rapid path switching is implemented. Therefore, BFD does not need to be deployed, between PE devices that establish a path, to detect a fault. To be specific, BFD does not need to be deployed between the ingress PE device and the egress PE device to detect a fault. Therefore, an amount of BFD deployed in a PE device is reduced, resources that are of the PE device and that are occupied by the BFD is reduced, time for fault detection is reduced when the PE device determines a path, and a path switching speed is increased. In addition, the second PE device is configured with the third SRv6 VPN SID that is different from the first SRv6 VPN SID, so that the PE device 500 may establish the second path based on the third SRv6 VPN SID in the first VPN route. In this way, when a path directly connected to the PE device 500 and the second CE device is faulty, a packet transmitted by the PE device 500 to the second CE device may be transmitted on the second path through switching. Therefore, rapid path switching is implemented, the packet can be transmitted to the second CE device, and multi-homing protection is implemented.

Figure 9:
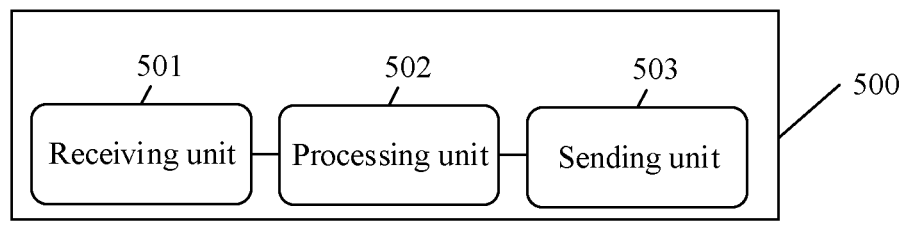
FIG. 9 is another schematic block diagram of a PE device according to an embodiment.

FIG. 9 is another schematic block diagram of the PE device 500 according to an embodiment.

It should be understood that, as shown in FIG. 9, the PE device 500 may further include a sending unit 503.

The sending unit 503 is configured to send a second VPN route to the second PE device, and the second VPN route carries the first SRv6 VPN SID and a fourth SRv6 VPN SID.

The fourth SRv6 VPN SID is used to identify the VPN to which the second CE device belongs or the outgoing interface through which the first PE device is connected to the second CE device, and the fourth SRv6 VPN SID is used by the second PE device to establish a third path from the second PE device to the first PE device. When a fourth path directly connected to the second PE device and the second CE device is faulty, the third path is used by the second PE device to transmit a packet to the second CE device. The fourth SRv6 VPN SID is different from the first SRv6 VPN SID, and the first SRv6 VPN SID is the same as the second SRv6 VPN SID stored in the second PE device.

It may be understood that the first VPN route is carried in a BGP-Prefix-SID attribute field of an MP-BGP message, and the BGP-Prefix-SID attribute field includes an SRv6-VPN SID TLV field. The SRv6-VPN SID TLV field includes a T field, an L field, and a V field, and the V field is used to carry the third SRv6 VPN SID.

It may be understood that the receiving unit 501 is further configured to receive a first packet. The first packet is sent by the first CE device to the second CE device, and an outer destination address encapsulated in the first packet is the first SRv6 VPN SID.

The processing unit 502 is further configured to determine that the first path is faulty.

The processing unit 502 is further configured to determine, based on the first SRv6 VPN SID and the third SRv6 VPN SID, to forward the first packet through the second path.

The PE device 500 according to this embodiment may correspond to an execution body in the route processing method according to the embodiments. In addition, the foregoing and other operations and/or functions of the modules in the PE device 500 are respectively used to implement corresponding procedures of the methods performed by the first PE device in the embodiment shown in FIG. 3. For brevity, details are not described herein again.

Figure 10:
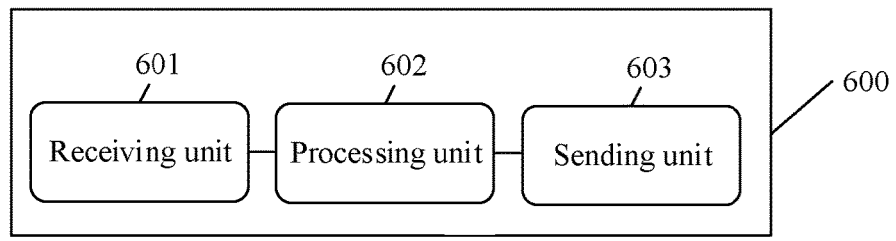
FIG. 10 is a schematic block diagram of a PE device according to another embodiment.

FIG. 10 is a schematic block diagram of a PE device 600 according to another embodiment.

The PE device 600 is used as a first PE device, and is used in a network that bears an SRv6-based VPN service. The network includes a first CE device, a second CE device, an ingress PE device, N egress PE devices, and at least one P device. The first CE device is connected to the ingress PE device, and the second CE device is multi-homed to the N egress PE devices. The ingress PE device is communicatively connected to the N egress PE devices by using the at least one P device, and the first CE device and the second CE device belong to a same VPN. The N egress PE devices include a first PE device and a second PE device. The first PE device is configured with a first SRv6 VPN SID, and the first SRv6 VPN SID is used to identify the VPN to which the second CE device belongs or an outgoing interface through which the first PE device is connected to the second CE device. The second PE device is configured with a second SRv6 VPN SID and a third SRv6 VPN SID, and both the second SRv6 VPN SID and the third SRv6 VPN SID are used to identify the VPN to which the second CE device belongs or an outgoing interface through which the second PE device is connected to the second CE device. The first SRv6 VPN SID is the same as the second SRv6 VPN SID, and N is an integer greater than or equal to 2.

As shown in FIG. 10, the PE device 600 may include a receiving unit 601, a processing unit 602, and a sending unit 603.

The receiving unit 601 is configured to receive a first packet. The first packet is sent by the first CE device to the second CE device, and an outer destination address encapsulated in the first packet is the first SRv6 VPN SID.

The processing unit 602 is configured to determine, based on the first SRv6 VPN SID, a first path for forwarding the first packet, and the first path is directly connected to the first PE device and the second CE device.

The processing unit 602 is further configured to determine that the first path is faulty. The first PE device determines, based on the first SRv6 VPN SID and the stored third SRv6 VPN SID sent by the second PE device, to forward the first packet through a second path, and the first PE device is connected to the second PE device by using the second path.

The sending unit 603 is configured to forward the first packet to the second CE through the second path.

In this embodiment, the second SRv6 VPN SID is the same as the first SRv6 VPN SID. Therefore, a path to the first SRv6 VPN SID includes a path to the PE device 600 and a path to the second PE device. Therefore, when a packet sent by the first CE device to the second CE device is transmitted, if a fifth path to the PE device 600 is faulty, a sixth path to the second PE device may be determined. Further, the packet may be transmitted to the second PE device on the sixth path through switching, so that the second PE device may send the packet to the second CE device. In this way, when the first CE device sends the packet to the second CE device, in a process of determining a packet transmission path, an ingress PE device may not detect whether an egress PE device on the path is faulty. When the ingress PE device detects, in a packet transmission process, that the egress PE device is faulty, the packet is transmitted through a path that is to a PE device which has a same SRv6 VPN SID as the egress PE device, so that rapid path switching is implemented. Therefore, BFD does not need to be deployed, between PE devices that establish a path, to detect a fault. To be specific, BFD does not need to be deployed between the ingress PE device and the egress PE device to detect a fault. Therefore, an amount of BFD deployed in a PE device is reduced, resources that are of the PE device and that are occupied by the BFD is reduced, time for fault detection is reduced when the PE device determines a path, and a path switching speed is increased. In addition, the PE device 600 transmits the first packet to the second CE device. When a path directly connected to the PE device 600 and the second CE device is faulty, a packet may be transmitted on the second path through switching. Therefore, rapid path switching is implemented, the packet can be transmitted to the second CE device, and multi-homing protection is implemented.

It may be understood that the receiving unit 601 is further configured to receive a first VPN route sent by the second PE device, and the first VPN route includes the second SRv6 VPN SID and the third SRv6 VPN SID.

The processing unit 602 is further configured to establish the second path based on the third SRv6 VPN SID when determining that the second SRv6 VPN SID is the same as the first SRv6 VPN SID.

The PE device 600 according to this embodiment may correspond to an execution body in the data transmission method according to the embodiments. In addition, the foregoing and other operations and/or functions of the modules in the PE device 600 are respectively used to implement corresponding procedures of the methods performed by the first PE device in the embodiment shown in FIG. 4. For brevity, details are not described herein again.

Figure 11:
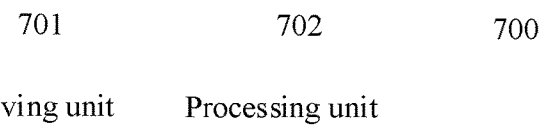
FIG. 11 is a schematic block diagram of a P device according to an embodiment.

FIG. 11 is a schematic block diagram of a P device 700 according to an embodiment.

The P device 700 is used as a first P device, and is used in a network that bears an SRv6-based VPN service. The network includes a first CE device, a second CE device, an ingress PE device, N egress PE devices, and at least one P device. The first CE device is connected to the ingress PE device, and the second CE device is multi-homed to the N egress PE devices. The ingress PE device is communicatively connected to the N egress PE devices by using the at least one P device, and the first CE device and the second CE device belong to a same VPN. The N egress PE devices include a first PE device and a second PE device. The first PE device is configured with a first SRv6 VPN SID, and the first SRv6 VPN SID is used to identify the VPN to which the second CE device belongs or an outgoing interface through which the first PE is connected to the second CE device. The second PE device is configured with a second SRv6 VPN SID, and the second SRv6 VPN SID is used to identify the VPN to which the second CE device belongs or an outgoing interface through which the second PE device is connected to the second CE device. The first SRv6 VPN SID is the same as the second SRv6 VPN SID. The at least one P device includes the first P device, the first P device is a neighboring node of the first PE device, and the first PE device is a next hop of the first P device. N is an integer greater than or equal to 2.

As shown in FIG. 11, the P device 700 may include a receiving unit 701 and a processing unit 702.

The receiving unit 701 is configured to receive a first route sent by the first PE device, and the first route includes a network segment to which the first SRv6 VPN SID belongs.

The receiving unit 701 is further configured to receive a second route sent by the second PE device, and the second route includes a network segment to which the second SRv6 VPN SID belongs.

The processing unit 702 is configured to establish a fifth path from the first P device to the first PE device based on the network segment to which the first SRv6 VPN SID belongs, and the fifth path is used by the first P device to forward a packet to the second CE device.

The processing unit 702 is further configured to establish a sixth path from the first P device to the second PE device based on the network segment to which the second SRv6 VPN SID belongs, and when the fifth path is faulty, the sixth path is used by the first P device to forward the packet to the second CE device.

In this embodiment, the second SRv6 VPN SID is the same as the first SRv6 VPN SID, and the network segment to which the second SRv6 VPN SID belongs is also the same as the network segment to which the first SRv6 VPN SID belongs. Therefore, a path from the P device 700 to the first SRv6 VPN SID includes a path to the first PE device and a path to the second PE device. Therefore, when a packet sent by the first CE device to the second CE device is transmitted by the P device 700, if the fifth path to the first PE is faulty, the P device 700 may determine the sixth path to the second PE device, and further transmit the packet to the second PE device on the sixth path through switching, so that the second PE device may send the packet to the second CE device. In this way, when the first CE device sends the packet to the second CE device, in a process of determining a packet transmission path, an ingress PE device may not detect whether an egress PE device on the path is faulty. When the ingress PE device detects, in a packet transmission process, that the egress PE device is faulty, the packet is transmitted through a path that is to a PE device which has a same SRv6 VPN SID as the egress PE device, so that rapid path switching is implemented. Therefore, BFD does not need to be deployed, between PE devices that establish a path, to detect a fault. To be specific, BFD does not need to be deployed between the ingress PE device and the egress PE device to detect a fault. Therefore, an amount of BFD deployed in a PE device is reduced, resources that are of the PE device and that are occupied by the BFD is reduced, time for fault detection is reduced when the PE device determines a path, and a path switching speed is increased.

It may be understood that the receiving unit 701 is further configured to receive a first packet. The first packet is sent by the first CE device to the second CE device, and an outer destination address encapsulated in the first packet is the first SRv6 VPN SID.

The processing unit 702 is further configured to determine, based on the first SRv6 VPN SID when the fifth path is faulty, to forward the first packet through the sixth path.

The P device 700 according to this embodiment may correspond to an execution body in the route processing method according to the embodiments. In addition, the foregoing and other operations and/or functions of the modules in the P device 700 are respectively used to implement corresponding procedures of the methods performed by the first P device in the embodiment shown in FIG. 5. For brevity, details are not described herein again.

Figure 12:
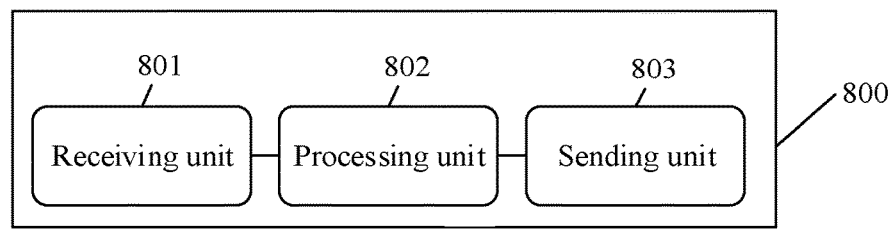
FIG. 12 is a schematic block diagram of a P device according to another embodiment.

FIG. 12 is a schematic block diagram of a P device 800 according to another embodiment.

The P device 800 is used as a first P device, and is used in a network that bears an SRv6-based VPN service. The SRv6-based VPN includes a first customer edge CE device, a second CE device, an ingress PE device, N egress PE devices, and at least one P device. The first CE device is connected to the ingress PE device, and the second CE device is multi-homed to the N egress PE devices. The ingress PE device is communicatively connected to the N egress PE devices by using the at least one P device, and the first CE device and the second CE device belong to a same VPN. The N egress PE devices include a first PE device and a second PE device. The first PE device is configured with a first SRv6 VPN SID, and the first SRv6 VPN SID is used to identify the VPN to which the second CE device belongs or an outgoing interface through which the first PE is connected to the second CE device. The second PE device is configured with a second SRv6 VPN SID, and the second SRv6 VPN SID is used to identify the VPN to which the second CE device belongs or an outgoing interface through which the second PE device is connected to the second CE device. The first SRv6 VPN SID is the same as the second SRv6 VPN SID. The at least one P device includes the first P device, the first P device is a neighboring node of the first PE device, and the first PE device is a next hop of the first P device. N is an integer greater than or equal to 2.

As shown in FIG. 12, the P device 800 may include a receiving unit 801, a processing unit 802, and a sending unit 803.

The receiving unit 801 is configured to receive a first packet. The first packet is sent by the first CE device to the second CE device, and an outer destination address encapsulated in the first packet is the first SRv6 VPN SID.

The processing unit 802 is configured to determine, based on the first SRv6 VPN SID, a fifth path for transmitting the first packet, and the first P device is connected to the first PE device by using the fifth path.

The processing unit 802 is further configured to determine that the fifth path is faulty. The first P device determines, based on the first SRv6 VPN SID, to forward the first packet through a sixth path, and the first P device is connected to the second PE by using the sixth path.

The sending unit 803 is configured to forward the first packet to the second CE device through the sixth path.

In this embodiment, the second SRv6 VPN SID is the same as the first SRv6 VPN SID. Therefore, a path from the P device 800 to the first SRv6 VPN SID includes a path to the first PE device and a path to the second PE device. Therefore, when a packet sent by the first CE device to the second CE device is transmitted by the P device 800, if the fifth path to the first PE is faulty, the P device 800 may determine the sixth path to the second PE device, and further transmit the packet to the second PE device on the sixth path through switching, so that the second PE device may send the packet to the second CE device. In this way, when the first CE device sends the packet to the second CE device, in a process of determining a packet transmission path, an ingress PE device may not detect whether an egress PE device on the path is faulty. When the ingress PE device detects, in a packet transmission process, that the egress PE device is faulty, the packet is transmitted through a path that is to a PE device which has a same SRv6 VPN SID as the egress PE device, so that rapid path switching is implemented. Therefore, BFD does not need to be deployed, between PE devices that establish a path, to detect a fault. To be specific, BFD does not need to be deployed between the ingress PE device and the egress PE device to detect a fault. Therefore, an amount of BFD deployed in a PE device is reduced, resources that are of the PE device and that are occupied by the BFD is reduced, time for fault detection is reduced when the PE device determines a path, and a path switching speed is increased.

It may be understood that the receiving unit 801 is further configured to receive a first route sent by the first PE device, and the first route includes a network segment to which the first SRv6 VPN SID belongs.

The receiving unit 801 is further configured to receive a second route sent by the second PE device, and the second route includes a network segment to which the second SRv6 VPN SID belongs.

The processing unit 802 is further configured to establish the fifth path based on the network segment to which the first SRv6 VPN SID belongs and the sixth path based on the network segment to which the second SRv6 VPN SID belongs. When the fifth path is faulty, the sixth path is used by the first P device to forward a packet to the second CE device.

The P device 800 according to this embodiment may correspond to an execution body in the data transmission method according to the embodiments. In addition, the foregoing and other operations and/or functions of the modules in the P device 800 are respectively used to implement corresponding procedures of the methods performed by the first PE device in the embodiment shown in FIG. 7. For brevity, details are not described herein again.

Figure 13:
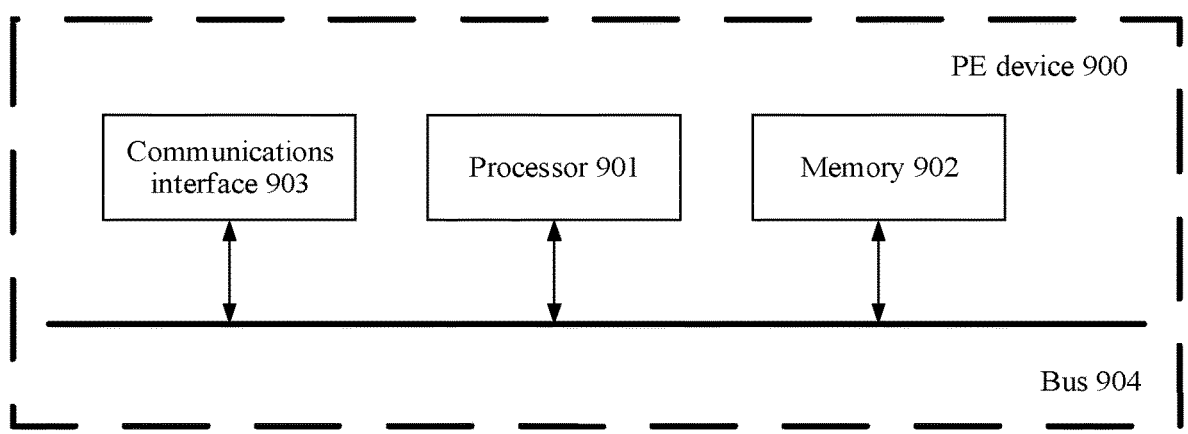
FIG. 13 is a schematic block diagram of a PE device according to still another embodiment.

FIG. 13 is a schematic structural diagram of another PE device 900 according to an embodiment. As shown in FIG. 13, the PE device 900 includes a processor 901, a memory 902, and a communications interface 903.

The processor 901 may be a central processing unit (CPU), a network processor (NP), or a combination of a CPU and an NP. The processor 301 may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof.

The memory 902 may be a separate device, or may be integrated into the processor 901. The memory 902 may include a volatile memory, for example, a random-access memory (RAM); or the memory may include a nonvolatile memory, for example, a flash memory, a hard disk (HDD), or a solid-state drive (SSD); or the memory 902 may include a combination of the foregoing types of memories.

The communications interface 903 is configured to communicate with an external device, and the communications interface 903 may be a wireless interface or a wired interface. The wireless interface may be a cellular mobile network interface, a wireless local area network interface, or the like. The wired interface may be an Ethernet interface, for example, an optical interface or an electrical interface.

The PE device 900 may further include a bus 904. The bus 904 is configured to connect the processor 901, the memory 902, and the communications interface 903, so that the processor 901, the memory 902, and the communications interface 903 communicate with each other by using the bus 904. The bus 904 may be classified into an address bus, a data bus, a control bus, and the like. For ease of representation, only one thick line is used to represent the bus in FIG. 13, but this does not mean that there is only one bus or only one type of bus.

The PE device 900 is configured to implement the corresponding procedures performed by the first PE device in the route processing method in the embodiment shown in FIG. 3. For brevity, details are not described herein again.

Optionally, the memory 902 may be further configured to store a program instruction. The processor 901 invokes the program instruction stored in the memory 902, and may perform one or more steps in the method shown in FIG. 3, or an optional implementation thereof.

The processor 901 is configured to perform all operations of the processing unit 502 of the PE device 500 shown in FIG. 8 or FIG. 9, and the communications interface 903 may be configured to perform all operations of the receiving unit 501 of the PE device 500 shown in FIG. 8 or FIG. 9 and the sending unit 503 shown in FIG. 9.

Figure 14:
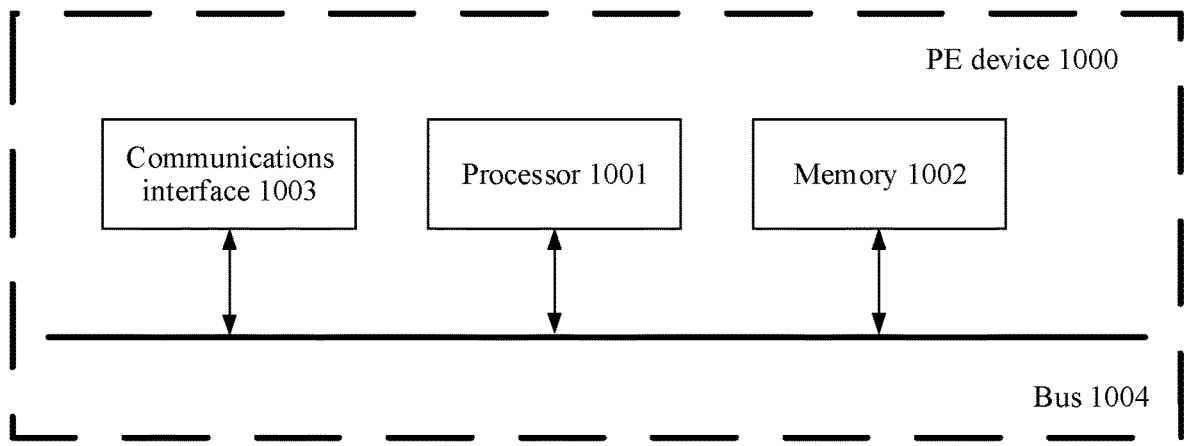
FIG. 14 is a schematic block diagram of a PE device according to yet another embodiment.

FIG. 14 is a schematic structural diagram of still another PE device 1000 according to an embodiment. As shown in FIG. 14, the PE device 1000 includes a processor 1001, a memory 1002, and a communications interface 1003.

The processor 1001 may be a CPU, a network processor, or a combination of a CPU and an NP. The processor 1001 may further include a hardware chip. The hardware chip may be an ASIC, a PLD, or a combination thereof. The PLD may be a CPLD, an FPGA, generic array logic, or any combination thereof.

The memory 1002 may be a separate device, or may be integrated into the processor 1001. The memory 1002 may include a volatile memory, such as a RAM; or the memory may include a nonvolatile memory, such as a flash memory, a hard disk, or a solid-state drive; or the memory 1002 may include a combination of the foregoing types of memories.

The communications interface 1003 is configured to communicate with an external device, and the communications interface 1003 may be a wireless interface or a wired interface. The wireless interface may be a cellular mobile network interface, a wireless local area network interface, or the like. The wired interface may be an Ethernet interface, for example, an optical interface or an electrical interface.

The PE device 1000 may further include a bus 1004. The bus 1004 is configured to connect the processor 1001, the memory 1002, and the communications interface 1003, so that the processor 1001, the memory 1002, and the communications interface 1003 communicate with each other by using the bus 1004. The bus 1004 may be classified into an address bus, a data bus, a control bus, and the like. For ease of representation, only one thick line is used to represent the bus in FIG. 14, but this does not mean that there is only one bus or only one type of bus.

The PE device 1000 is configured to implement the corresponding procedures performed by the first PE device in the data transmission method in the embodiment shown in FIG. 4. For brevity, details are not described herein again.

Optionally, the memory 1002 may be further configured to store a program instruction. The processor 1001 invokes the program instruction stored in the memory 1002, and may perform one or more steps in the method shown in FIG. 4, or an optional implementation thereof.

The processor 1001 is configured to perform all operations of the processing unit 602 of the PE device 600 shown in FIG. 10, and the communications interface 1003 may be configured to perform all operations of the receiving unit 601 and the sending unit 603 of the PE device 600 shown in FIG. 10.

Figure 15:
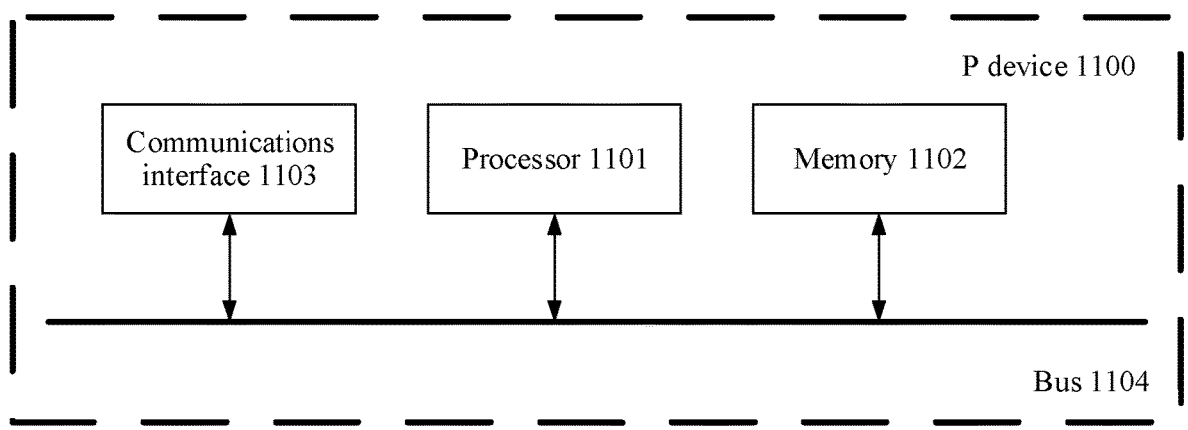
FIG. 15 is a schematic block diagram of a P device according to still another embodiment.

FIG. 15 is a schematic structural diagram of another P device 1100 according to an embodiment. As shown in FIG. 15, the P device 1100 includes a processor 1101, a memory 1102, and a communications interface 1103.

The processor 1101 may be a CPU, a network processor, or a combination of a CPU and an NP. The processor 1101 may further include a hardware chip. The hardware chip may be an ASIC, a PLD, or a combination thereof. The PLD may be a CPLD, an FPGA, a GAL, or any combination thereof.

The memory 1102 may be a separate device, or may be integrated into the processor 1101. The memory 1102 may include a volatile memory, such as a RAM; or the memory may include a nonvolatile memory, such as a flash memory, a hard disk, or a solid-state drive; or the memory 1102 may include a combination of the foregoing types of memories.

The communications interface 1103 is configured to communicate with an external device, and the communications interface 1103 may be a wireless interface or a wired interface. The wireless interface may be a cellular mobile network interface, a wireless local area network interface, or the like. The wired interface may be an Ethernet interface, for example, an optical interface or an electrical interface.

The P device 1100 may further include a bus 1104. The bus 1104 is configured to connect the processor 1101, the memory 1102, and the communications interface 1103, so that the processor 1101, the memory 1102, and the communications interface 1103 communicate with each other by using the bus 1104. The bus 1104 may be classified into an address bus, a data bus, a control bus, and the like. For ease of representation, only one thick line is used to represent the bus in FIG. 15, but this does not mean that there is only one bus or only one type of bus.

The P device 1100 is configured to implement the corresponding procedures performed by the first P device in the route processing method in the embodiment shown in FIG. 5. For brevity, details are not described herein again.

Optionally, the memory 1102 may be further configured to store a program instruction. The processor 1101 invokes the program instruction stored in the memory 1102, and may perform one or more steps in the method shown in FIG. 5, or an optional implementation thereof.

The processor 1101 is configured to perform all operations of the processing unit 702 of the P device 700 shown in FIG. 11, and the communications interface 1103 may be configured to perform all operations of the receiving unit 701 of the P device 700 shown in FIG. 11.

Figure 16:
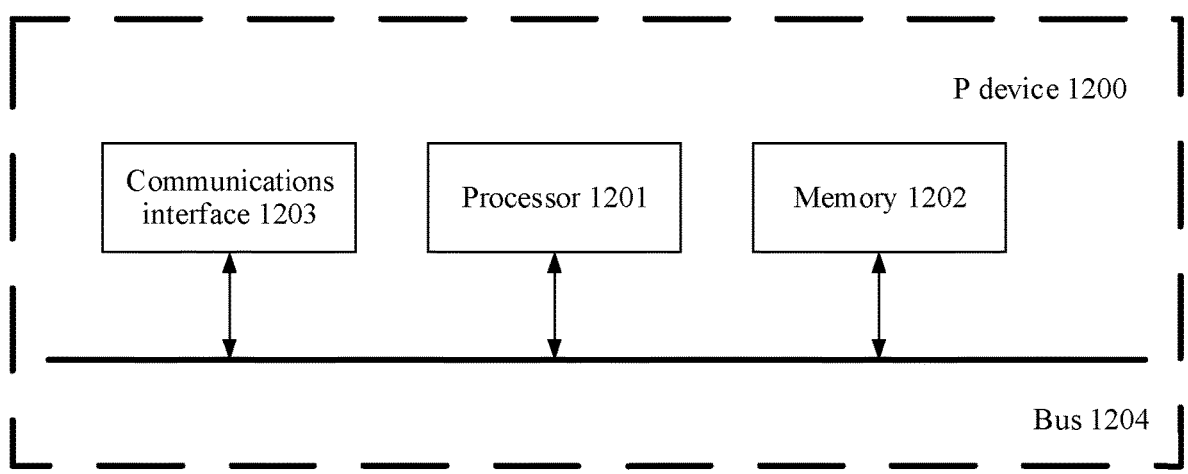
FIG. 16 is a schematic block diagram of a P device according to yet another embodiment.

FIG. 16 is a schematic structural diagram of another P device 1200 according to an embodiment. As shown in FIG. 16, the P device 1200 includes a processor 1201, a memory 1202, and a communications interface 1203.

The processor 1201 may be a CPU, a network processor, or a combination of a CPU and an NP. The processor 1201 may further include a hardware chip. The hardware chip may be an ASIC, a PLD, or a combination thereof. The PLD may be a CPLD, a field programmable gate array FPGA, generic array logic, or any combination thereof.

The memory 1202 may be a separate device, or may be integrated into the processor 1101. The memory 1102 may include a volatile memory, such as a random access memory RAM; or the memory may include a nonvolatile memory, such as a flash memory, a hard disk, or a solid-state drive; or the memory 1202 may include a combination of the foregoing types of memories.

The communications interface 1203 is configured to communicate with an external device, and the communications interface 1203 may be a wireless interface or a wired interface. The wireless interface may be a cellular mobile network interface, a wireless local area network interface, or the like. The wired interface may be an Ethernet interface, for example, an optical interface or an electrical interface.

The P device 1200 may further include a bus 1204. The bus 1204 is configured to connect the processor 1201, the memory 1202, and the communications interface 1203, so that the processor 1201, the memory 1202, and the communications interface 1203 communicate with each other by using the bus 1204. The bus 1204 may be classified into an address bus, a data bus, a control bus, and the like. For ease of representation, only one thick line is used to represent the bus in FIG. 16, but this does not mean that there is only one bus or only one type of bus.

The P device 1200 is configured to implement the corresponding procedures performed by the first P device in the route processing method in the embodiment shown in FIG. 7. For brevity, details are not described herein again.

Optionally, the memory 1202 may be further configured to store a program instruction. The processor 1201 invokes the program instruction stored in the memory 1202, and may perform one or more steps in the method shown in FIG. 7, or an optional implementation thereof.

The processor 1201 is configured to perform all operations of the processing unit 802 of the P device 800 shown in FIG. 12, and the communications interface 1203 may be configured to perform all operations of the receiving unit 801 and the sending unit 803 of the P device 800 shown in FIG. 12.

An embodiment further provides a communications system, including the PE device 500 shown in FIG. 8 or FIG. 9 and the P device 700 shown in FIG. 11.

An embodiment further provides another communications system, including the PE device 500 shown in FIG. 8 or FIG. 9 and the P device 700 shown in FIG. 12.

An embodiment further provides still another communications system, including the PE device 600 shown in FIG. 10 and the P device 800 shown in FIG. 11.

An embodiment further provides yet another communications system, including the PE device 600 shown in FIG. 10 and the P device 800 shown in FIG. 12.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instruction is loaded and executed on a computer, the procedure or functions according to the embodiments are all or partially generated. The computer may be a general-purpose computer, a special-purpose computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD) a semiconductor medium (for example, an SSD), or the like.

It should be understood that a person skilled in the art can combine optional features, steps, or methods that are described in the embodiments without creative efforts, and this belongs to the embodiments disclosed. For brevity, descriptions of different combinations are not repeatedly provided.

It should be understood that sequence numbers of the foregoing processes do not mean execution sequences in the embodiments. The execution sequences of the processes should be determined based on functions and internal logic of the processes, and should not constitute any limitation on the implementation processes of the embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope.

It may be clearly understood by a person skilled in the art that, for convenient and brief description, for a detailed working process of the foregoing system, apparatus, and unit, refer to a corresponding process in the foregoing method embodiments, and details are not described herein again.

In the embodiments provided, it should be understood that the disclosed system, apparatus, and method may be implemented in another manner. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit.

The foregoing descriptions are merely specific implementations, but are not intended to limit the protection scope. Any variation or replacement readily figured out by a person skilled in the art within the technical scope disclosed shall fall within the protection scope of the present disclosure. Therefore, the protection scope of the present disclosure shall be subject to the protection scope of the claims.

What is claimed is:

1. A first provider edge (PE) device comprising:
    a memory configured to store instructions; and
    a processor coupled to the memory and configured to execute the instructions to cause the first PE device to:
        receive a first packet destined for a customer edge (CE) device, wherein the first packet comprises an outer destination address that is a first Segment Routing over Internet Protocol version 6 (SRv6) virtual private network (VPN) segment identifier (SID), wherein the first SRv6 VPN SID identifies a VPN to which the CE device belongs, and wherein the CE device is multi-homed to the first PE device and a second PE device while in an all-active mode;
        change, when a first path directly connecting the first PE device to the CE device is faulty, the outer destination address from the first SRv6 VPN SID into a third SRv6 VPN SID to create a modified first packet, wherein the third SRv6 VPN SID identifies the VPN and is from the second PE device; and
        forward the modified first packet through a second path connecting the first PE device to the second PE device.

2. The first PE device of claim 1, wherein, when executed by the processor, the instructions further cause the first PE device to receive a first VPN route from the second PE device, and wherein the first VPN route comprises the first SRv6 VPN SID and the third SRv6 VPN SID.

3. The first PE device of claim 2, wherein the first VPN route is carried in a Border Gateway Protocol (BGP) prefix SID (BGP-Prefix-SID) attribute field of a multiprotocol extension for BGP (MG-BGP) message.

4. The first PE device of claim 1, wherein, when executed by the processor, the instructions further cause the first PE device to send a second VPN route to the second PE device, and wherein the second VPN route carries the first SRv6 VPN SID and a fourth SRv6 VPN SID.

5. The first PE device of claim 1, wherein, when executed by the processor, the instructions further cause the first PE device to send a third VPN route to a provider (P) device, and wherein the third VPN route comprises a first network segment to which the first SRv6 VPN SID belongs.

6. The first PE device of claim 2, wherein, when executed by the processor, the instructions further cause the first PE device to establish the second path based on the third SRv6 VPN SID.

7. The first PE device of claim 4, wherein the fourth SRv6 VPN SID identifies the VPN to which the CE device belongs.

8. The first PE device of claim 4, wherein the fourth SRv6 VPN SID identifies an outgoing interface through which the first PE device is connected to the CE device.

9. A communication method implemented by a first provider edge (PE) device and comprising:
    receiving a first packet destined for a customer edge (CE) device, wherein the first packet comprises an outer destination address that is a first Segment Routing over Internet Protocol version 6 (SRv6) virtual private network (VPN) segment identifier (SID), and wherein the first SRv6 VPN SID identifies a VPN to which the CE device belongs;
    changing, when a first path directly connecting the first PE device to the CE device is faulty, the outer destination address from the first SRv6 VPN SID into a third SRv6 VPN SID to create a modified first packet, wherein the third SRv6 VPN SID identifies the VPN and is from a second PE device;
    forwarding the modified first packet through a second path connecting the first PE device to the second PE device; and
    sending a second VPN route to the second PE device, wherein the second VPN route carries the first SRv6 VPN SID and a fourth SRv6 VPN SID.

10. The method of claim 9, further comprising receiving a first VPN route from the second PE device, wherein the first VPN route comprises the first SRv6 VPN SID and the third SRv6 VPN SID.

11. The method of claim 10, wherein the first VPN route is carried in a Border Gateway Protocol (BGP) prefix SID (BGP-Prefix-SID) attribute field of a multiprotocol extension for BGP (MG-BGP) message.

12. The method of claim 10, further comprising establishing the second path based on the third SRv6 VPN SID.

13. The method of claim 9, wherein the fourth SRv6 VPN SID identifies the VPN to which the CE device belongs.

14. The method of claim 9, wherein the fourth SRv6 VPN SID identifies an outgoing interface through which the first PE device is connected to the CE device.

15. The method of claim 9, further comprising sending a third VPN route to a provider (P) device, wherein the third VPN route comprises a first network segment to which the first SRv6 VPN SID belongs.

16. The method of claim 9, wherein, the CE device is multi-homed to the first PE device and the second PE device while in an all-active mode.

17. A communication system comprising:
    a second provider edge (PE) device;
    a customer edge (CE) device; and
    a first PE device configured to:
        receive a first packet destined for the CE device, wherein the first packet comprises an outer destination address that is a first Segment Routing over Internet Protocol (IP) version 6 (SRv6) virtual private network (VPN) segment identifier (SID), and wherein the first SRv6 VPN SID identifies a VPN to which the CE device belongs;
        change, when a first path directly connecting the first PE device to the CE device is faulty, the outer destination address from the first SRv6 VPN SID into the a third SRv6 VPN SID to create a modified first packet, wherein the third SRv6 VPN SID identifies the VPN and is from a second PE device;
        receive a first VPN route from the second PE device, wherein the first VPN route comprises the first SRv6 VPN SID and the third SRv6 VPN SID; and forward the modified first packet through a second path connecting the first PE device to the second PE device, wherein the CE device is configured to be multi-homed to the first PE device and the second PE device while in an all-active mode.

18. The communications system of claim 17, wherein the first VPN route is carried in a Border Gateway Protocol (BGP) prefix SID (BGP-Prefix-SID) attribute field of a multiprotocol extension for BGP (MG-BGP) message.

19. The communications system of claim 17, wherein the first PE device is further configured to send a second VPN route to the second PE device, and wherein the second VPN route carries the first SRv6 VPN SID and a fourth SRv6 VPN SID.

20. The communications system of claim 17, wherein the first PE device is further configured to establish the second path based on the third SRv6 VPN SID.

* * * * *